United States Patent
Moghaddam et al.

(10) Patent No.: US 12,326,393 B2
(45) Date of Patent: Jun. 10, 2025

(54) ENHANCED DUAL-PASS AND MULTI-PASS PARTICLE DETECTION

(71) Applicant: PARTICLE MEASURING SYSTEMS, INC., Boulder, CO (US)

(72) Inventors: Mehran Vahdani Moghaddam, Boulder, CO (US); Brian A. Knollenberg, Boulder, CO (US); Dwight Sehler, Boulder, CO (US)

(73) Assignee: PARTICLE MEASURING SYSTEMS, INC., Boulder, CO (US)

( * ) Notice: Subject to any disclaimer, the term of this patent is extended or adjusted under 35 U.S.C. 154(b) by 224 days.

(21) Appl. No.: 18/156,583

(22) Filed: Jan. 19, 2023

(65) Prior Publication Data

US 2023/0236107 A1    Jul. 27, 2023

Related U.S. Application Data

(60) Provisional application No. 63/301,615, filed on Jan. 21, 2022.

(51) Int. Cl.
  *G01N 15/14* (2024.01)
  *G01N 15/1434* (2024.01)

(52) U.S. Cl.
  CPC ..... *G01N 15/1434* (2013.01); *G01N 15/1459* (2013.01); *G01N 2015/1454* (2013.01);
  (Continued)

(58) Field of Classification Search
  CPC ........... G01N 15/1434; G01N 15/1459; G01N 2015/1454; G01N 2015/1486; G01N 2015/1493; G01N 2015/1497
  See application file for complete search history.

(56) References Cited

U.S. PATENT DOCUMENTS

| 4,594,715 A | 6/1986 | Knollenberg |
| 4,798,465 A | 1/1989 | Knollenberg |

(Continued)

FOREIGN PATENT DOCUMENTS

| JP | H03-067154 A | † 3/1991 |
| JP | H04-369464 A | † 12/1992 |

(Continued)

OTHER PUBLICATIONS

International Search Report and Written Opinion dated Jun. 26, 2023 in International Application No. PCT/US2023/060874, from which the present application claims priority, 18 pp.

*Primary Examiner* — Jamil Ahmed
(74) *Attorney, Agent, or Firm* — Leydig Voit & Mayer, Ltd.

(57) ABSTRACT

A particle detection system may include a light source, a first beam splitter, a particle interrogation zone, a reflecting surface, a second beam splitter, a first photodetector, and a second photodetector. The first beam splitter may be configured to split the source beam into an interrogation beam and a reference beam. The particle interrogation zone may be disposed in the path of the interrogation beam. The reflecting surface may be configured to reflect the interrogation beam back on itself. The second beam splitter may be configured to: (i) receive the reference beam and side scattered light from one or more particles interacting with the interrogation beam in the particle interrogation zone; and (ii) produce a first component beam and second component beam. The first photodetector may be configured to detect the first component beam. The second photodetector may be configured to detect the second component beam.

23 Claims, 14 Drawing Sheets

(52) U.S. Cl.
CPC ............... *G01N 2015/1486* (2013.01); *G01N 2015/1493* (2013.01); *G01N 2015/1497* (2013.01)

(56) References Cited

U.S. PATENT DOCUMENTS

| | | | |
|---|---|---|---|
| 4,893,928 A | 1/1990 | Knollenberg | |
| 5,282,151 A | 1/1994 | Knollenberg | |
| 5,283,199 A | 2/1994 | Bacon, Jr. et al. | |
| 5,671,046 A | 9/1997 | Knowlton | |
| 5,726,753 A | 3/1998 | Sandberg | |
| 5,751,422 A | 5/1998 | Mitchell | |
| 5,805,281 A | 9/1998 | Knowlton et al. | |
| 5,861,950 A | 1/1999 | Knowlton | |
| 5,889,589 A | 3/1999 | Sandberg | |
| 5,903,338 A | 5/1999 | Mavliev et al. | |
| 6,167,107 A | 12/2000 | Bates | |
| 6,246,474 B1 | 6/2001 | Cerni et al. | |
| 6,275,290 B1 | 8/2001 | Cerni et al. | |
| 6,615,679 B1 | 9/2003 | Knollenberg et al. | |
| 6,709,311 B2 | 3/2004 | Cerni | |
| 6,859,277 B2 | 2/2005 | Wagner et al. | |
| 6,903,818 B2 | 6/2005 | Cerni et al. | |
| 6,945,090 B2 | 9/2005 | Rodier | |
| 7,030,980 B1 | 4/2006 | Sehler et al. | |
| 7,088,446 B2 | 8/2006 | Cerni | |
| 7,088,447 B1 | 8/2006 | Bates et al. | |
| 7,208,123 B2 | 4/2007 | Knollenberg et al. | |
| 7,235,214 B2 | 6/2007 | Rodier et al. | |
| RE39,783 E | 8/2007 | Cerni et al. | |
| 7,456,960 B2 | 11/2008 | Cerni et al. | |
| 7,576,857 B2 | 8/2009 | Wagner | |
| 7,667,839 B2 | 2/2010 | Bates | |
| 7,746,469 B2 | 6/2010 | Shamir et al. | |
| 7,796,255 B2 | 9/2010 | Miller | |
| 7,916,293 B2 | 3/2011 | Mitchell et al. | |
| 7,973,929 B2 | 7/2011 | Bates | |
| 7,985,949 B2 | 7/2011 | Rodier | |
| 8,027,035 B2 | 9/2011 | Mitchell et al. | |
| 8,109,129 B2 | 2/2012 | Gorbunov | |
| 8,154,724 B2 | 4/2012 | Mitchell et al. | |
| 8,174,697 B2 | 5/2012 | Mitchell et al. | |
| 8,427,642 B2 | 4/2013 | Mitchell et al. | |
| 8,800,383 B2 | 8/2014 | Bates | |
| 8,869,593 B2 | 10/2014 | Gorbunov et al. | |
| 9,631,222 B2 | 4/2017 | Ketcham et al. | |
| 9,638,665 B2 | 5/2017 | Gorbunov | |
| 9,682,345 B2 | 6/2017 | Gromala et al. | |
| 9,808,760 B2 | 11/2017 | Gromala et al. | |
| 9,810,558 B2 | 11/2017 | Bates et al. | |
| 9,885,640 B2 | 2/2018 | Ketcham et al. | |
| 9,983,113 B2 | 5/2018 | Matsuda et al. | |
| 9,989,462 B2 | 6/2018 | Lumpkin et al. | |
| 10,197,487 B2 | 2/2019 | Knollenberg et al. | |
| 10,345,200 B2 | 7/2019 | Scialo et al. | |
| 10,371,620 B2 | 8/2019 | Knollenberg et al. | |
| 10,416,069 B2 | 9/2019 | Saitou et al. | |
| 10,792,694 B2 | 10/2020 | Gorbunov et al. | |
| 10,859,487 B2 | 12/2020 | Knollenberg et al. | |
| 10,908,059 B2 | 2/2021 | Knollenberg et al. | |
| 10,921,229 B2 | 2/2021 | Shamir | |
| 10,928,293 B2 | 2/2021 | Knollenberg et al. | |
| 10,997,845 B2 | 5/2021 | MacLaughlin et al. | |
| 11,181,455 B2 | 11/2021 | Bates et al. | |
| 11,215,546 B2 | 1/2022 | MacLaughlin et al. | |
| 11,231,345 B2 | 1/2022 | Scialo et al. | |
| 11,237,095 B2 | 2/2022 | Rodier et al. | |
| 11,250,684 B2 | 2/2022 | MacLaughlin et al. | |
| 11,255,760 B2 | 2/2022 | Scialo et al. | |
| 11,268,930 B2 | 3/2022 | Rodier et al. | |
| 11,320,360 B2 | 5/2022 | Lumpkin et al. | |
| 11,385,161 B2 | 7/2022 | Bates et al. | |
| 11,416,123 B2 | 8/2022 | Pandolfi et al. | |
| 11,428,617 B2 | 8/2022 | Knollenberg et al. | |
| 11,428,619 B2 | 8/2022 | Knollenberg et al. | |
| 11,540,248 B2 | 12/2022 | Scialo et al. | |
| 11,576,045 B2 | 2/2023 | Michaelis et al. | |
| 2005/0028593 A1 | 2/2005 | Rodier | |
| 2009/0078862 A1 | 3/2009 | Rodier et al. | |
| 2009/0190128 A1 | 7/2009 | Cerni et al. | |
| 2009/0268202 A1 | 10/2009 | Wagner | |
| 2013/0242301 A1 | 9/2013 | Berg et al. | |
| 2015/0000595 A1 | 1/2015 | Gorbunov et al. | |
| 2015/0259723 A1 | 9/2015 | Hartigan et al. | |
| 2015/0260628 A1 | 9/2015 | Shamir et al. | |
| 2016/0126081 A1 | 5/2016 | Gorbunov | |
| 2016/0139013 A1 | 5/2016 | Gorbunov | |
| 2017/0160178 A1† | 6/2017 | Matsuda | |
| 2017/0176312 A1 | 6/2017 | Shamir | |
| 2019/0277745 A1* | 9/2019 | Matsuda | G01N 15/1434 |
| 2020/0150018 A1 | 5/2020 | Shamir | |
| 2020/0240896 A1 | 7/2020 | Karasikov et al. | |
| 2021/0208054 A1 | 7/2021 | Ellis et al. | |
| 2021/0223273 A1 | 7/2021 | Scialo et al. | |
| 2021/0381948 A1* | 12/2021 | Rodier | G01N 15/0211 |
| 2022/0155212 A1 | 5/2022 | Rodier et al. | |
| 2022/0228963 A1 | 7/2022 | Shamir | |
| 2022/0236146 A1 | 7/2022 | Scialo et al. | |
| 2022/0397495 A1 | 12/2022 | Yates et al. | |
| 2022/0397510 A1 | 12/2022 | Yates et al. | |
| 2022/0397519 A1 | 12/2022 | Knollenberg et al. | |
| 2023/0009668 A1 | 1/2023 | Scialo et al. | |
| 2023/0087059 A1 | 3/2023 | Knollenberg et al. | |
| 2023/0112632 A1 | 4/2023 | Michaelis et al. | |

FOREIGN PATENT DOCUMENTS

| | | | |
|---|---|---|---|
| JP | 2003-240715 A | † | 8/2003 |
| JP | 2005-172465 A | † | 6/2005 |
| WO | WO 2019/082186 | | 5/2019 |
| WO | WO 2022/103814 | | 5/2022 |

\* cited by examiner
† cited by third party

ENHANCED DUAL-PASS AND MULTI-PASS PARTICLE DETECTION

CROSS-REFERENCE TO RELATED APPLICATIONS

This application claims the benefit of priority to U.S. Provisional Patent Application No. 63/301,615, filed Jan. 21, 2022, which is hereby incorporated by reference in its entirety.

BACKGROUND OF INVENTION

Advancement of technologies requiring cleanroom conditions has resulted in a need for the detection and characterization of smaller and smaller particles. For example, microelectronic foundries pursue detection of particles less than 20 nm in size, and in some cases less than 10 nm in size, as they may affect the increasingly sensitive manufacturing processes and products. Similarly, the need for aseptic processing conditions for manufacturing of pharmaceuticals and biomaterials requires accurate characterization of viable and non-viable particles to address compliance standard relating to health and human safety.

Typically, these industries rely on optical particle counters for detection and characterization of small particles. The ability to detect smaller particles requires new approaches for optical particle counting such as systems employing increasing laser powers, shorter excitation wavelengths and more complex techniques such as condensation nuclei counting, which in turn can dramatically increase the cost and overall complexity of devices for detection of nanometer scale particles. These new approaches can also require more frequent calibration and maintenance to provide the necessary reliability and reproducibility.

Various optical particle counters are known in the art, for example, scattered light optical particle counters are provided in U.S. Pat. No. 7,916,293 and transmission/extinction particle counters, including those utilizing structured beams and/or interferometry are provided in U.S. Pat. Nos. 7,746,469, 9,983,113, 10,416,069, US Patent Publication Nos. 2019/0277745 and US 20170176312, and PCT international Publication WO 2019/082186. Each of these references are hereby incorporated in their entirety and specifically to illustrate particle counter system components and configurations that are useful for the detection and characterization of small particles.

It can be seen from the foregoing that there is a need in the art for systems and methods that provide enhanced optically sensing particles having small size dimensions.

SUMMARY OF THE INVENTION

The present invention relates to detection of particles. Systems and methods for detection of particles are provided, the systems and methods exhibiting enhanced signal to noise ratios.

In one embodiment, a particle detection system comprises a light source providing a source beam of electromagnetic radiation, a first beam splitter configured to split the source beam into an interrogation beam and a reference beam, a particle interrogation zone disposed in the path of the interrogation beam, the particle interrogation zone including particles, a reflecting surface configured to reflect the interrogation beam back on itself to produce an amplified beam intersecting the particle interrogation zone, a second beam splitter, a first photodetector configured to detect the first component beam, and a second photodetector configured to detect the second component beam. The second beam splitter may be configured to: (i) receive the reference beam and a side scattered beam produced via one or more particles interacting with the interrogation beam in the particle interrogation zone, and (ii) produce a first component beam and second component beam.

In one embodiment, the amplified beam comprises coherent light.

In one embodiment, the first photodetector is configured to produce a first signal, and the second photodetector is configured to produce a second signal, the system being configured to produce a differential signal based on the first and second signals.

In one embodiment, the first component beam comprises a first component of the side scattered beam and a first component of the reference beam, and the second component beam comprises a second component of the side scattered beam and a second component of the reference beam.

In one embodiment, the reference beam can pass through a neutral density filter, to attenuate the beam intensity, in order to increase the visibility of interference fringes at the detector plane such that the signal to noise ratio is enhanced.

In one embodiment, the interrogation beam and reference beams are s-polarized.

In one embodiment, the system includes an optical isolator positioned between the light source and the reflecting surface to prevent or reduce optical feedback to the light source. In one embodiment, the system includes a focusing lens disposed in the path of the interrogation beam between the reflecting surface and the particle interrogation zone.

In one embodiment, the reflecting surface is a surface of a plane mirror. In one embodiment, the reflecting surface is a surface of a concave mirror.

In one embodiment, the scattered beam and the reference beam are configured for homodyne interferometric detection.

In one embodiment, the scattered beam and the reference beam are configured for heterodyne interferometric detection. In one embodiment, the system includes first and second acousto-optic modulators configured to shift the frequency of the reference beam. In one embodiment, the first component beam is characterized by a phase shift of $\pi/2$ relative to the second component beam.

In one embodiment, a particle detection system includes a light source providing a beam of electromagnetic radiation, a particle interrogation zone disposed in the path of the beam, the particle interrogation zone including particles, a reflecting surface configured to reflect the beam back on itself to produce an amplified beam intersecting the particle interrogation zone, and a photodetector configured to detect a side scattered beam produced via one or more particles interacting with the beam in the particle interrogation zone.

In one embodiment, the amplified beam comprises coherent light. In one embodiment, a focusing lens may be disposed in the path of the beam between the reflecting surface and the particle interrogation zone. In one embodiment, an optical isolator may be positioned between the light source and the reflecting surface to prevent or reduce optical feedback to the light source.

In one embodiment, a particle detection system includes a light source providing a source beam of electromagnetic radiation, one or more optical elements configured to convert the source beam into an interrogation beam, a particle interrogation zone disposed in the path of the interrogation beam, the particle interrogation zone including particles, a first reflecting surface configured to reflect the interrogation beam back on itself to produce an amplified interrogation beam intersecting the particle interrogation zone, a second reflecting surface configured to reflect a first side scattered beam toward a photodetector, the first side scattered beam produced via one or more particles interacting with the interrogation beam in the particle interrogation zone, the photodetector being configured to detect a combination of: the first side scattered beam; and a second side scattered beam, the second side scattered beam produced via one or more particles interacting with the interrogation beam in the particle interrogation zone.

In one embodiment, the second reflecting surface is configured to reflect the first side scattered beam back through the interrogation zone. In one embodiment, the second reflecting surface is configured to reflect the first side scattered beam back on itself to produce an amplified side scattered beam. In one embodiment, the first side scattered beam and the second side scattered beam are scattered in opposite directions. In one embodiment, the first side scattered beam and the second side scattered beam are scattered in orthogonal directions. In one embodiment, the amplified interrogation beam comprises coherent light.

In one embodiment, the system includes an optical isolator positioned between the light source and the reflecting surface to prevent or reduce optical feedback to the light source. In one embodiment the system includes a first focusing lens disposed in the path of the interrogation beam between the reflecting surface and the particle interrogation zone.

In one embodiment, the first reflecting surface is a surface of a plane mirror. In one embodiment, the second reflecting surface is a surface of a plane mirror. In one embodiment, the first reflecting surface is a surface of a concave mirror. In one embodiment, the second reflecting surface is a surface of a concave mirror. In one embodiment, the system includes a second focusing lens disposed in the path of the first side scattered beam between the second reflecting surface and the particle interrogation zone.

In one embodiment, a particle detection system includes a light source providing a source beam of electromagnetic radiation, a first beam splitter configured to split the source beam into an interrogation beam and a reference beam, a particle interrogation zone disposed in the path of the interrogation beam, the particle interrogation zone including particles, a first reflecting surface configured to reflect the interrogation beam back on itself to produce an amplified interrogation beam intersecting the particle interrogation zone, a second reflecting surface configured to reflect a first side scattered beam toward a second beam splitter, the first side scattered beam produced via one or more particles interacting with the interrogation beam in the particle interrogation zone, a first photodetector configured to detect the first component beam; and a second photodetector configured to detect the second component beam. The second beam splitter may be configured to: (i) receive the reference beam and a combination of the first side scattered beam and a second side scattered beam, the second side scattered beam produced via one or more particles interacting with the interrogation beam in the particle interrogation zone side; and (ii) produce a first component beam and a second component beam.

In one embodiment, the first component beam comprises a first component of the side scattered beam and a first component of the reference beam; and the second component beam comprises a second component of the side scattered beam and a second component of the reference beam.

In one embodiment, the second reflecting surface is configured to reflect the first side scattered beam back through the interrogation zone. In one embodiment, the second reflecting surface is configured to reflect the first side scattered beam back on itself to produce an amplified side scattered beam.

In one embodiment, the first side scattered beam and the second side scattered beam are scattered in opposite directions. In one embodiment, the first side scattered beam and the second side scattered beam are scattered in orthogonal directions.

In one embodiment, the amplified interrogation beam comprises coherent light.

In one embodiment, the system includes an optical isolator positioned between the light source and the reflecting surface to prevent or reduce optical feedback to the light source. In one embodiment, the system includes a first focusing lens disposed in the path of the interrogation beam between the reflecting surface and the particle interrogation zone.

In one embodiment, the first reflecting surface is a surface of a plane mirror. In one embodiment, the second reflecting surface is a surface of a plane mirror. In one embodiment, the first reflecting surface is a surface of a concave mirror. In one embodiment, the second reflecting surface is a surface of a concave mirror.

In one embodiment, the system includes a second focusing lens disposed in the path of the first side scattered beam between the second reflecting surface and the particle interrogation zone.

In one embodiment, the scattered beam and the reference beam are configured for homodyne interferometric detection.

In one embodiment, the scattered beam and the reference beam are configured for heterodyne interferometric detection. In one embodiment, the system includes first and second acousto-optic modulators configured to shift the frequency of the reference beam. In one embodiment, the first component beam is characterized by a phase shift of $\pi/2$ relative to the second component beam.

In one embodiment, the intensity of the reference beam is attenuated with a beam attenuator disposed between the first and second beam splitter.

In one embodiment, a particle detection system comprises a light source providing a beam of electromagnetic radiation; a particle interrogation zone disposed in the path of the beam, the particle interrogation zone including particles; first and second reflecting surfaces disposed on opposite sides of the particle interrogation zone, wherein the first and second reflecting surfaces are configured such that each time the beam reflects off a respective one of the reflecting surfaces, the beam reflects at an angle that is nonparallel to an angle at which the beam approaches the respective reflecting surface; and a photodetector configured to detect a side scattered beam produced via one or more particles interacting with the beam in the particle interrogation zone.

In one embodiment, the first reflecting surface has a first axis of symmetry and the second reflecting surface has a second axis of symmetry, and wherein the first and second reflecting surfaces are oriented such that the first axis of symmetry, the second axis of symmetry, or both, is nonparallel to the beam as it enters the interrogation zone.

In one embodiment, the difference between the angle at which the beam approaches the respective reflecting surface and the angle at which the beam reflects off the respective reflecting surface is 2 degrees or less.

In one embodiment, the first reflecting surface, the second reflecting surface, or both, are concave toward the particle interrogation zone. In one embodiment, a first aperture is disposed in the first reflecting surface and a second aperture is disposed in the second reflecting surface. In one embodiment, the first and second apertures are disposed in the first reflecting surface. In one embodiment, the first and second reflecting surfaces have a reflectivity greater than 99%.

In one embodiment, the first and second reflecting surfaces are configured such that for each time the beam traverses the particle interrogation zone the beam has beam waist, the beam waist of each traverse overlapping in the interrogation zone.

In one embodiment, a method of particle detection includes producing a source beam of electromagnetic radiation, splitting the source beam into an interrogation beam and a reference beam, directing the interrogation beam toward a particle interrogation zone, passing the interrogation beam through the particle interrogation zone, reflecting the interrogation beam back though the interrogation zone, producing a side scattered beam via interaction of the interrogation beam with the particle in the particle interrogation zone, combining the side scattered beam and the reference beam and producing a first component beam and a second component beam therefrom, detecting the first component beam, and detecting the second component beam.

In one embodiment, the reflecting step comprises reflecting the interrogation beam back on itself to produce an amplified beam intersecting the particle interrogation zone. In one embodiment, the amplified beam comprises coherent light.

In one embodiment, the method includes producing a first signal correlated to the first component beam, producing a second signal correlated to the second component beam, and producing a differential signal based on the first and second signal.

In one embodiment, the first component beam comprises a first component of the side scattered beam and a first component of the reference beam, and the second component beam comprises a second component of the side scattered beam and a second component of the reference beam.

In one embodiment, the method includes passing the source beam through an optical isolator positioned between the light source and the reflecting surface to prevent or reduce optical feedback to the light source.

In one embodiment, the method includes shifting the frequency of the reference beam. In one embodiment, the first component beam is characterized by a phase shift of $\pi/2$ relative to the second component beam.

In one embodiment, a method of particle detection includes producing a beam of electromagnetic radiation, directing the beam toward a particle interrogation zone, the particle interrogation zone including particles, passing the beam through the particle interrogation zone, reflecting the beam back on itself to produce an amplified beam intersecting the particle interrogation zone, and detecting side scattered light via a photodetector, the side scattered light produced via one or more particles interacting with the amplified beam in the particle interrogation zone.

In one embodiment, a method of particle detection includes producing an interrogation beam of electromagnetic radiation, directing the interrogation beam toward a particle interrogation zone, the particle interrogation zone including particles, passing the interrogation beam through the particle interrogation zone, reflecting the interrogation beam back on itself to produce an amplified interrogation beam intersecting the particle interrogation zone, producing a first side scattered beam and a second side scattered beam via one or more particles interacting with the amplified interrogation beam in the particle interrogation zone, combining the first and second side scattered beams, and detecting the combined first and second scattered beams.

In one embodiment, the combining step comprises reflecting the first side scattered beam back through the particle interrogation zone.

In one embodiment, the first side scattered beam and the second side scattered beam are scattered in opposite directions. In one embodiment, the first side scattered beam and the second side scattered beam are scattered in orthogonal directions. In one embodiment, the amplified interrogation beam comprises coherent light.

In one embodiment, a method of particle detection includes producing an interrogation beam of electromagnetic radiation, directing the interrogation beam toward a particle interrogation zone, the particle interrogation zone including particles, passing the interrogation beam through the particle interrogation zone, reflecting the interrogation beam back on itself to produce an amplified interrogation beam intersecting the particle interrogation zone, producing a first side scattered beam and a second side scattered beam via one or more particles interacting with the amplified interrogation beam in the particle interrogation zone, combining the first side scattered beam and the second side scattered beam to produce an amplified side scattered beam, combining the amplified side scattered beam with the reference beam and producing a first component beam and a second component beam therefrom, detecting the first component beam, and detecting the second component beam.

In one embodiment, the first component beam comprises a first component of the amplified side scattered beam and a first component of the reference beam; and the second component beam comprises a second component of the amplified side scattered beam and a second component of the reference beam.

In one embodiment, the step of combining the first side scattered beam and the second side scattered beam to produce an amplified side scattered beam comprises reflecting the first side scattered beam back through the particle interrogation zone. In one embodiment, the second reflecting surface is configured to reflect the first side scattered beam back on itself.

In one embodiment, the method includes producing a first signal correlated to the first component beam, producing a second signal correlated to the second component beam, producing a differential signal based on the first and second signal.

In one embodiment, the method includes shifting the frequency of the reference beam via a first and a second acousto-optic modulator. In one embodiment, the first component beam is characterized by a phase shift of $\pi/2$ relative to the second component beam.

In one embodiment, the first side scattered beam and the second side scattered beam are scattered in opposite directions. In one embodiment, the first side scattered beam and the second side scattered beam are scattered in orthogonal directions.

In one embodiment, the amplified interrogation beam comprises coherent light.

In one embodiment, the particle detection system may be a dual pass system.

In one embodiment, the particle detection system may be a multi pass system.

In one embodiment, the light source is a solid state laser. In one embodiment, the light source is a laser diode or laser oscillator. In one embodiment, the light source is continuous laser. In one embodiment, the light source is pulsed laser.

In one embodiment, the system comprises a plurality of light sources.

In one embodiment, the light source provides light having a radiant power selected from the range of 0.01 to 200 W. In one embodiment, the light source provides light having a radiant wavelength selected from the range 160 nm to 1500 nm.

The systems and methods of the invention provide detection of particles in flowing fluids, including detection, counting and sizing of single particles in a fluid flow. In an embodiment, the fluid is a liquid or a gas. In an embodiment, the system is for detection of particles in liquid chemicals. In an embodiment, the system is for detection of particles in ultrapure water. In an embodiment, the system is for detection of particles in high pressure gases. In an embodiment, the system is for detection of particles in air. In an embodiment, the system is for detection of particles on surfaces.

In one embodiment, the reference beam is a homodyne interferometry reference beam.

In one embodiment, the reference beam is a heterodyne interferometry reference beam.

In one embodiment, a method of particle detection comprises producing an beam of electromagnetic radiation; directing the beam toward a particle interrogation zone, the particle interrogation zone including particles; passing the beam through or past a first reflecting surface; passing the beam through the particle interrogation zone and onto a second reflecting surface; reflecting the beam back through the particle interrogation zone via the second reflecting surface, wherein the beam reflects at an angle that is nonparallel to an angle at which the beam approaches the second reflecting surface; reflecting the beam back through the particle interrogation zone via the first reflecting surface, wherein the beam reflects at an angle that is nonparallel to an angle at which the beam approaches the first reflecting surface; and detecting side scattered light produced via one or more particles interacting with the beam in the particle interrogation zone.

In one embodiment, the method comprises passing the beam through an aperture of the second reflecting surface. In one embodiment, the aperture is a first aperture of the first reflecting surface, the method comprising passing the beam through a second aperture of the first reflecting surface. In one embodiment, the first reflecting surface has a first axis of symmetry and the second reflecting surface has a second axis of symmetry, and wherein the first and second reflecting surfaces are oriented such that the first axis of symmetry, the second axis of symmetry, or both, is nonparallel to the beam as it enters the interrogation zone.

In one embodiment, the difference between the angle at which the beam approaches the first reflecting surface and the angle at which the beam reflects off the first reflecting surface is 2 degrees or less. the difference between the angle at which the beam approaches the second reflecting surface and the angle at which the beam reflects off the second reflecting surface is 2 degrees or less. In one embodiment, the first reflecting surface, the second reflecting surface, or both, are concave toward the particle interrogation zone.

In one embodiment, the first and second reflecting surfaces have a reflectivity greater than 99%. In one embodiment, the first and second reflecting surfaces are configured such that for each time the beam traverses the particle interrogation zone the beam has beam waist, the beam waist of each traverse overlapping in the interrogation zone. In one embodiment, the method includes passing the beam through an aperture of the first reflecting surface.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

STATEMENTS REGARDING CHEMICAL COMPOUNDS AND NOMENCLATURE

Figure 1A:
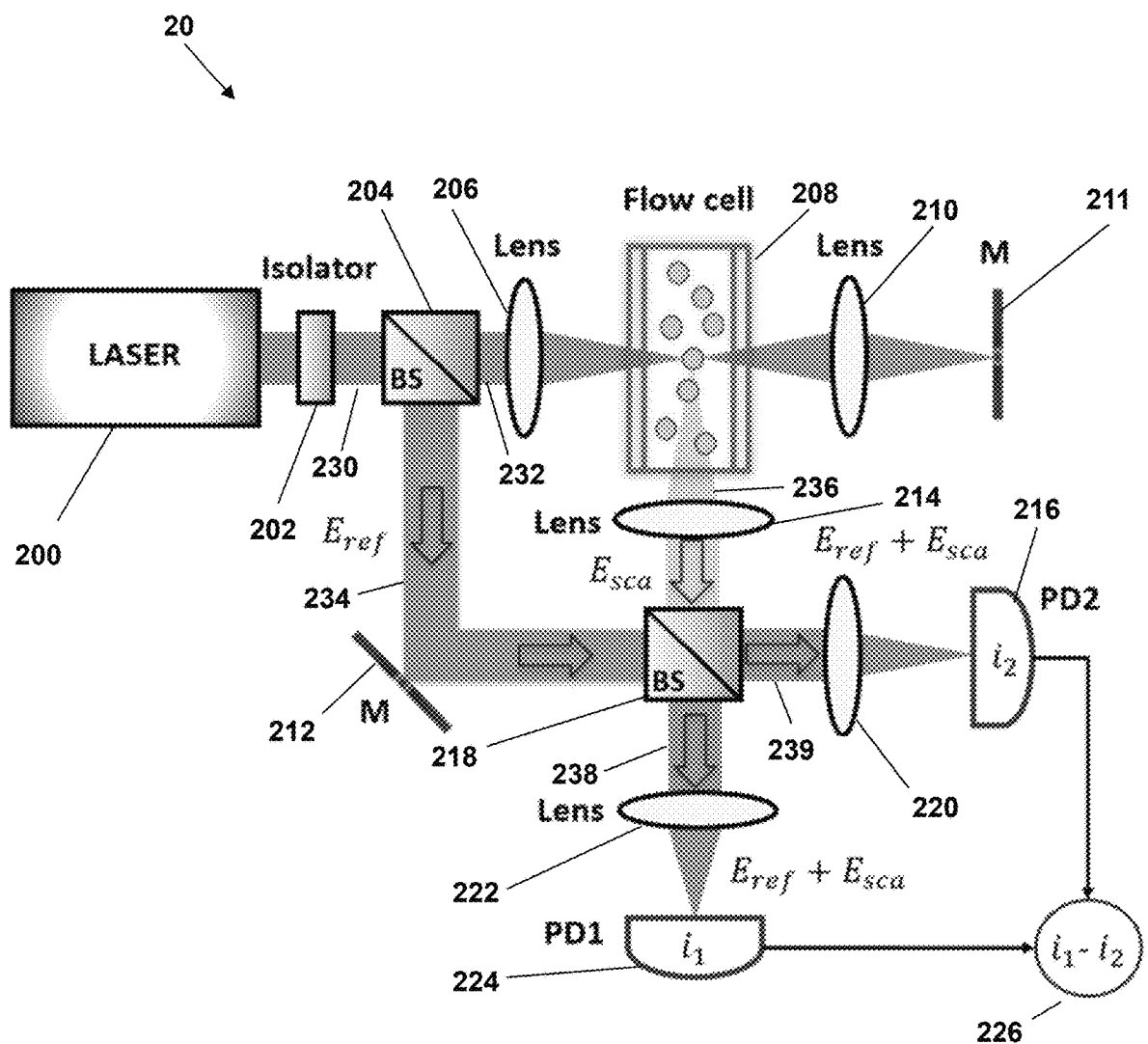
FIG. 1A is an optical schematic of one embodiment of a dual-pass homodyne interferometric detection system in accordance with the present disclosure.

In general, the terms and phrases used herein have their art-recognized meaning, which can be found by reference to standard texts, journal references and contexts known to those skilled in the art. The following definitions are provided to clarify their specific use in the context of the invention.

"Particles" refers to small objects which are often regarded as contaminants. A particle can be any material created by the act of friction, for example when two surfaces come into mechanical contact and there is mechanical movement. Particles can be composed of aggregates of material, such as dust, dirt, smoke, ash, water, soot, metal, oxides, ceramics, minerals, or any combination of these or other materials or contaminants. "Particles" may also refer to biological particles, for example, viruses, spores and microorganisms including bacteria, fungi, archaea, protists, other single cell microorganisms. In some embodiments, for example, biological particles are characterized by a size dimension (e.g., effective diameter) ranging from 0.1-15 µm, optionally for some applications ranging from 0.5-5 µm. A particle may refer to a small object which absorbs, emits or scatters light and is thus detectable by an optical particle counter. As used herein, "particle" is intended to be exclusive of the individual atoms or molecules of a carrier fluid, for example water, air, process liquid chemicals, process gases, etc. In some embodiments, particles may be initially present on a surface, such as a tools surface in a microfabrication facility, liberated from the surface and subsequently analyzed in a fluid. Some systems and methods are capable of detecting particles comprising aggregates of material having a size dimension, such as effective diameter, greater than 20 nm, 30 nm, 50 nm, 100 nm, 500 nm, 1 µm or greater, or 10 µm or greater. Some embodiments of the present invention are capable of detecting particles having a size dimension, such as effective diameter, selected from that range of 10 nm to 150 µm, optionally for some applications 10 nm to −10 µm, optionally for some applications 10 nm to −1 µm, and optionally for some applications 10 nm to −0.5 µm.

The expression "detecting a particle" broadly refers to sensing, identifying the presence of, counting and/or characterizing a particle, such as characterizing a particle with respect to a size dimension, such as effective diameter. In some embodiments, detecting a particle refers to counting particles. In some embodiments, detecting a particle refers to characterizing and/or measuring a physical characteristic of a particle, such as effective diameter, cross sectional dimension, shape, size, aerodynamic size, or any combination of these. In some embodiments, detection a particle is carried out in a flowing fluid, such as gas having a volumetric flow rate selected over the range of 0.05 CFM to 10 CFM, optionally for some applications 0.1 CFM to 5 CFM and optionally for some applications 0.5 CFM to 2 CFM. In some embodiments, detection a particle is carried out in a flowing fluid, such as liquid having a volumetric flow rate selected over the range of 1 to 1000 mL/min.

"Optical Particle Counter" or "particle counter" are used interchangeably and refer to a particle detection system that uses optical detection to detect particles, typically by analyzing particles in a fluid flow. Optical particle counters include liquid particle counters and aerosol particle counters, for example, including systems capable of detecting individual single particles in a fluid flow. Optical particle counters provide a beam of electromagnetic radiation (e.g. a laser) into the analysis area, where the beam interacts with any particles and then detects the particles based on scatter, emitted or transmitted light from the flow cell. Detection may focus on electromagnetic radiation that is scattered, absorbed, obscured and/or emitted by the particle(s). Various detectors for optical particle counters are known in the art, including for example, single detection elements (e.g., photodiode, photomultiplier tube, etc.), detector arrays, cameras, various detector orientations, etc. Optical particle counter includes condensation particle counters, condensation nuclei counters, split beam differential systems and the like. When used in the context of a condensation particle counter, the particle counter portion refers to the detection system (e.g. source of electromagnetic radiation, optics, filters, optical collection, detector, processor, etc.). In an embodiment, for example, an optical particle counter comprises a source for generating a beam of electromagnetic radiation, beam steering and/or shaping optics for directing and focusing the beam into a region where a fluid sample is flowing, for example a liquid or gas flowing through a flow cell. A typical optical particle counter comprises of a photodetector, such as optical detector array in optical communication with said flow cell, and collection optics for collecting and imaging electromagnetic radiation which is scattered, transmitted by or emitted by particles which pass through the beam. Particle counters may further comprise electronics and/or processors components for readout, signal processing and analysis of electrical signals produced by the photodetector including current to voltage converters, pulse height analyzers, and signal filtering and amplification electronics. An optical particle counter may also comprise a fluid actuation systems, such as a pump, fan or blower, for generating a flow for transporting a fluid sample containing particles through the detection region of a flow cell, for example, for generating a flow characterized by a volumetric flow rate. Useful flow rates for samples comprising one or more gases include a flow rate selected over the range of 0.05 CFM to 10 CFM, optionally for some applications 0.1 CFM to 5 CFM and optionally for some applications 0.5 CFM to 2 CFM. Useful flow rates for samples comprising one or more liquids include a flow rate selected over the range of 1 to 1000 mL/min.

Detecting and counting small particles (e.g., effective diameter less than 100 nm) in clean and ultraclean fluids in a manner that provides statistically significant data requires high signal-to-noise ratio (S/N). A high S/N ratio allows nanoparticles to be clearly detected above the noise floor. As used herein "statistically significant data" refers to detection of enough particles per unit time to be able to accurately assess contamination levels in the fluid. In some embodiments, high S/N does not relate to sizing accuracy directly. For example, in some optical particle counters the beam waist occupies a small fraction of the flow cell channel, and therefore, this approach monitors a subset of the total flow, such that it is possible for particles to pass through the edge of the beam where irradiance is less than the center. If a 50 nm particle passes through the outer edge of the beam, it may generate a signal similar to a 10 nm particle passing through the center of the beam. Therefore, it is possible for some optical particle counters to have high S/N and be able to detect, for example 20 nm particles, while not having very good sizing accuracy. In some of the present optical particle counters and methods a goal is to be able to count enough particles to provide a quantitative, statistically sound, assessment of contamination levels in ultrahigh purity fluids in the shortest period of time. For example, the current state of the art particle counter may require up to 40 minutes to count enough particles to provide a statistically appropriate concentration (acceptable relative standard deviation) measurement when monitoring a state of the art ultrapure water system. By improving and maintaining a high S/N through the present systems and methods, the time interval needed to measure this minimum statistically acceptable particle counts can be reduced by 10× or more. This provides value as it allows a user to identify deviations from process control limits more quickly.

The term "noise" refers to unwanted modifications of a signal (e.g. a signal of a photodetector) that interfere with the accuracy or precision of a particle detection system. Noise may derive from sources such as backscatter due to interfaces between materials in the optical path of the beam, backscatter due to contamination of optical components, and/or molecular scatter from the fluid in the particle interrogation region from reaching the laser. In some embodiments, noise due to backscatter may result in abnormal electronic signals whose amplitude can exceed a particle detection threshold, resulting in particle detection false counts.

The expression "high signal-to-noise ratio" refers to a signal-to-noise ratio of an optical particle detection system sufficient for accurate and sensitive detection of particles in a fluid flow, including particles characterized by a small physical dimension (e.g., an effective diameter of less than or equal to 200 nm, optionally for some embodiments less than or equal to 100 nm and optionally for some embodiments less than or equal to 50 nm). In an embodiment, "high signal-to-noise ratio" refers to a signal-to-noise ratio sufficiently high to sense particles characterized by a small physical dimension, such as particles having an effective diameter as low as 20 nm, optionally for some applications a diameter as low as 10 nm and optionally for some applications a diameter as low as 1 nm. In an embodiment, "high signal-to-noise ratio" refers to a signal-to-noise ratio sufficiently high to accurately detect and count particles with a false detection rate of less than or equal to 50 counts/L, for example, for detection of particles having an effective diameter selected over the range of 1-1000 nm. In an embodiment, "high signal-to-noise ratio" refers to a signal-to-noise ratio sufficiently high to provide a minimum statistically acceptable particle count in a timeframe at least a factor of 10× less than in a conventional optical particle counter. Systems and methods of the present disclosure may provide a high signal to noise ratio.

The expression "interferometric detection of particles" refers to systems and methods using optical interference to detect one or more particles. In some embodiments, coherent beams of electromagnetic radiation are superimposed to cause optical interference for sensing, counting and/or determining a size characterization of a particle that interacts with at least a portion of the electromagnetic radiation.

"Beam propagation axis" refers to an axis parallel to the direction of travel of a beam of electromagnetic radiation.

"Optical communication" refers to components which are arranged in a manner that allows light to transfer between the components.

"Optical axis" refers to a direction along which electromagnetic radiation propagates through a system.

"Light source" refers to a device or device component that is capable of delivering electromagnetic radiation to a sample. The term "light" is not limited to visible radiation, such as by a visible light beam, but is used in a broad sense to include any electromagnetic radiation also inclusive of visible radiation, ultraviolet radiation and/or infrared radiation. The optical source may be embodied as a laser or laser array, such as a diode laser, diode laser array, diode laser pumped solid state laser, LED, LED array, gas phase laser, laser oscillator, solid state laser, to name a few examples.

The term "electromagnetic radiation" and "light" are used synonymously in the present description and refer to waves of electric and magnetic fields. Electromagnetic radiation useful for the methods of the present invention include, but is not limited to ultraviolet light, visible light, infrared light, or any combination of these having wavelengths between about 100 nanometers to about 15 microns.

The term "particle interrogation zone" refers to a zone within a particle detection system where one or more particles interact with the incident beam and/or the pump beam to scatter light. In some embodiments, the particle interrogation zone may comprise a cuvette and/or a flow cell to constrain a particle-containing liquid flowing therethrough. In other embodiments, an unconstrained jet of particle-containing gas may flow through the particle interrogation zone. In still other embodiments, the particle interrogation zone may comprise a surface to be interrogated for particles.

As used herein "homodyne interferometric detection" refers to interferometric systems and methods wherein an incident beam is passed through a flow cell where it interacts with a particle, thereby scattering light, which is collected and combined with a reference beam which is not frequency shifted relative to the incident beam, with the combined light being measured via a detector.

As used herein, the term "heterodyne interferometric detection" refers to interferometric systems and methods wherein an incident beam is passed through a flow cell where it interacts with a particle, thereby scattering light, which is collected and combined with a reference signal which is frequency shifted relative to the incident beam, with the combined light being measured via a detector.

As used herein, "dual-pass" refers to configurations in which a beam is first directed at the interrogation zone, then reflected back on itself (for example via a mirror) and is subsequently directed at the interrogation zone a second time. In the case where the interrogation comprises a flow cell or cuvette, dual-pass refers to a configuration wherein a beam passes once through the flow cell or cuvette, and is then reflected back through the flow cell or cuvette (for example, via a mirror). In the case where the interrogation zone comprises a surface to be interrogated for particles, dual-pass refers to a configuration wherein a beam is directed once at a surface, is reflected back off the surface, and is then reflected back at the surface (for example, via a mirror). Thus, a dual-pass configuration may increase the amount of light scattered by a particle, and thus increase the sensitivity of a particle detection system.

As used herein, "multi-pass" refers to configurations in which a beam is first directed at the interrogation zone, then reflected back (for example via a mirror) and is subsequently directed at the interrogation zone a second time, then is directed back at the interrogation zone a third time (for example, via a semi-transparent mirror) and so on. In the case where the interrogation comprises a flow cell or cuvette, multi-pass refers to a configuration wherein a beam passes once through the flow cell or cuvette, and is then reflected back through the flow cell or cuvette (for example, via a mirror), then is directed back at the interrogation zone a third time (for example, via a semi-transparent mirror or via a mirror system having one or both mirrors disposed with their axis of symmetry slightly nonparallel to the beam as it enters the interrogation zone) and so on. In the case where the interrogation zone comprises a surface to be interrogated for particles, multi-pass refers to a configuration wherein a beam is directed once at a surface, is reflected back off the surface, and is then reflected back at the surface (for example, via a mirror), is reflected off the surface a second time, then is directed back at the interrogation zone a third time (for example, via a semi-transparent mirror) and so on. By utilizing a multi-pass configuration, a beam of light may interact many times with the same particle in the particle interrogation zone. Thus, a multi-pass configuration may increase the amount of light scattered by a particle, and thus increase the sensitivity of a particle detection system. Multi-pass systems may be configured such that for each pass, the beam waist of the beam occurs in the particle interrogation zone. Furthermore, multi-pass systems may be configured such that for each pass, the beam waist of the beam occurs in the particle interrogation zone As used herein, the term "reference beam" refers to a beam of light that does not interact with the particle under detection and optionally is phase matched with another source of electromagnetic radiation so as to generate optical interference.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Conventional interferometric particle detection systems are generally based either on Homodyne or Heterodyne detection techniques. In both techniques, the scattered weak signal is mixed with a strong reference beam and the intensity of interference pattern is analyzed with a photodetector. In Homodyne detection, the frequency of signal and the reference beams are identical whereas in the Heterodyne, the frequency of reference beam is shifted relative to the signal via one or more acousto-optic modulators (AOM). In conventional interferometric particle detection, the systems are single pass systems and thus may suffer from low signal to noise ratios, especially when dealing with very small particles (e.g., on the order of 20 nm).

Figure 1B:
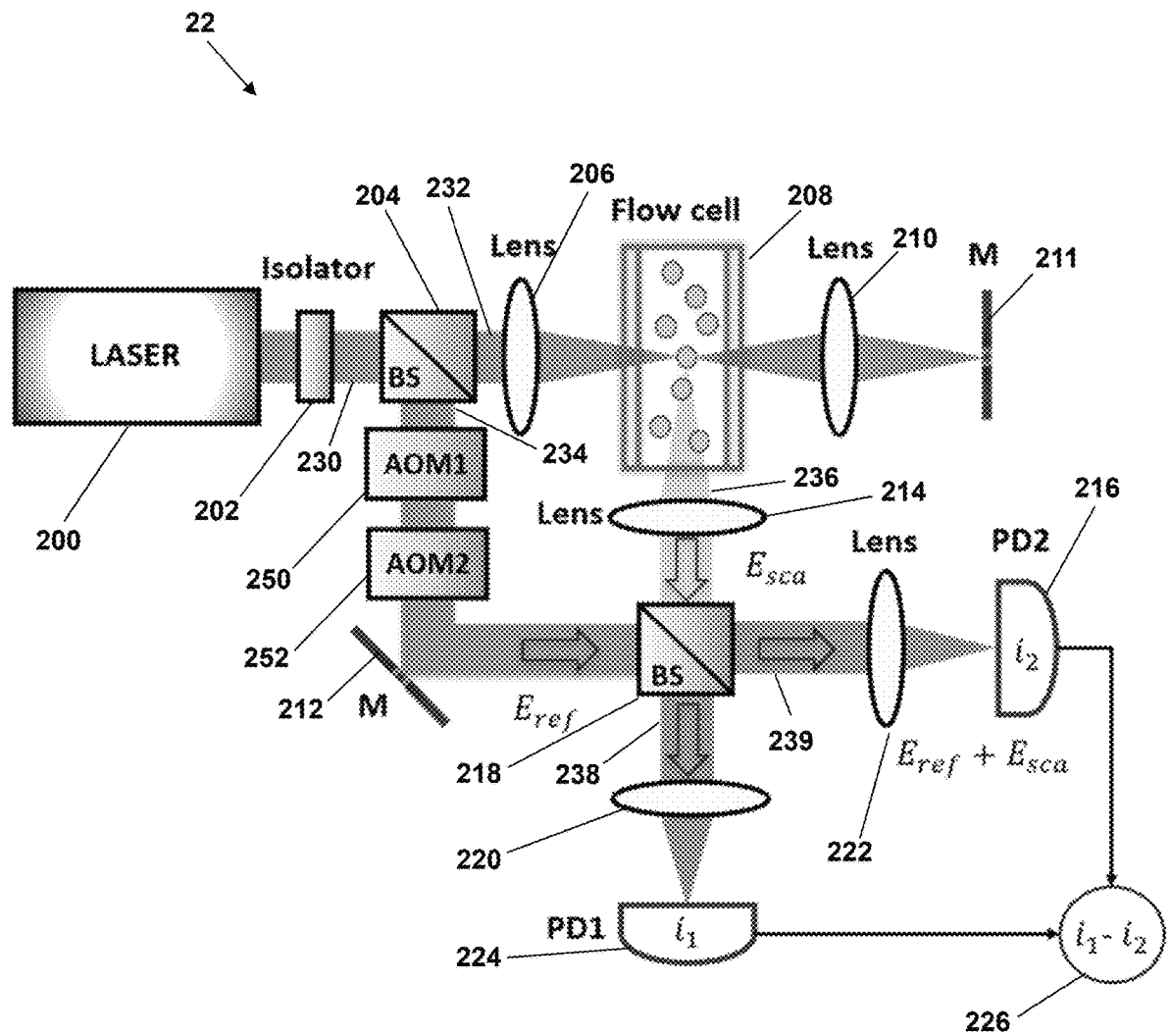
FIG. 1B is an optical schematic of one embodiment of a dual-pass heterodyne interferometric detection system in accordance with the present disclosure.
Figure 2A:
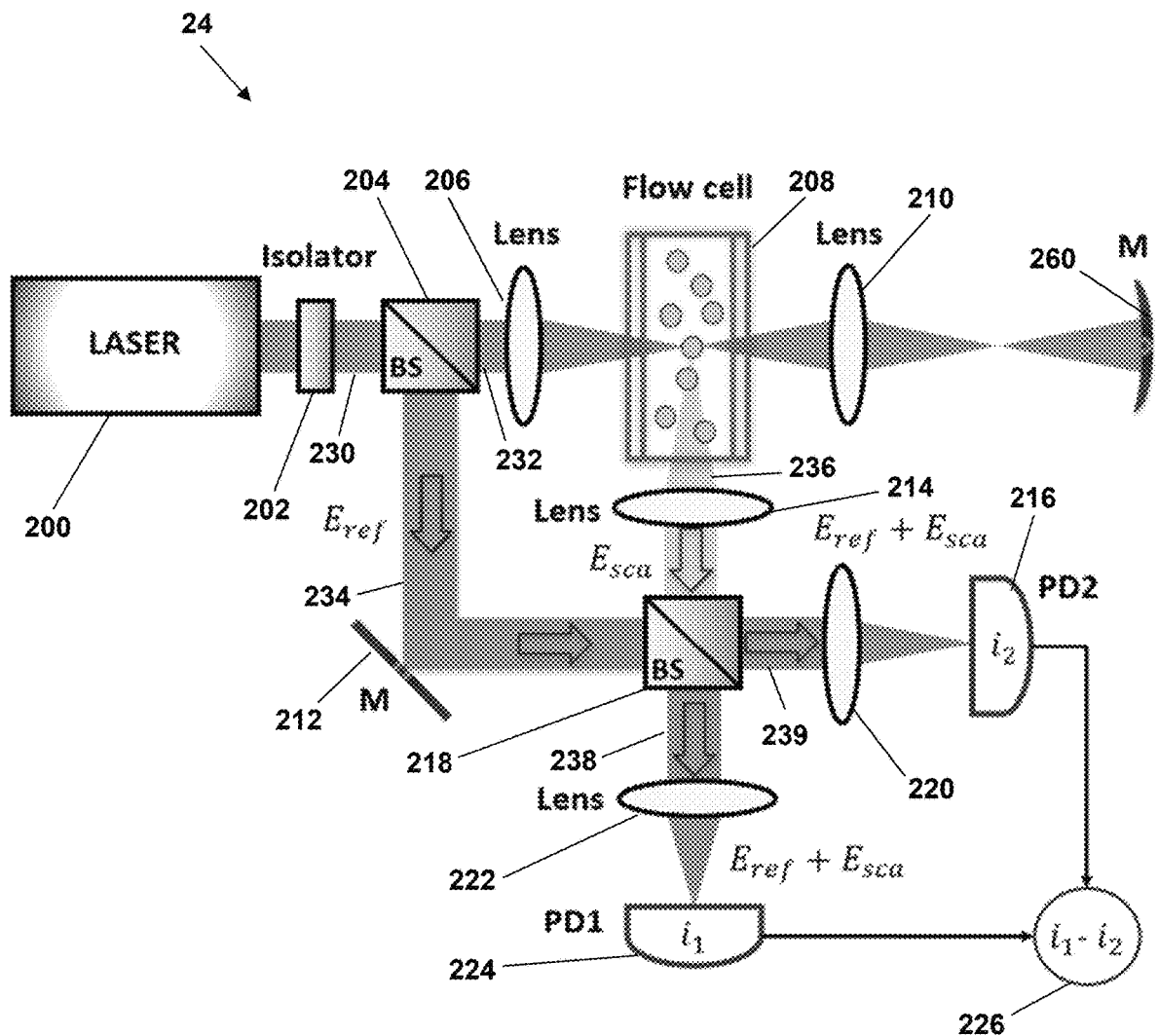
FIG. 2A is an optical schematic of one embodiment of a dual-pass homodyne interferometric detection system, showing a dual pass configuration using a combination of a lens and a concave mirror in accordance with the present disclosure.
Figure 2B:
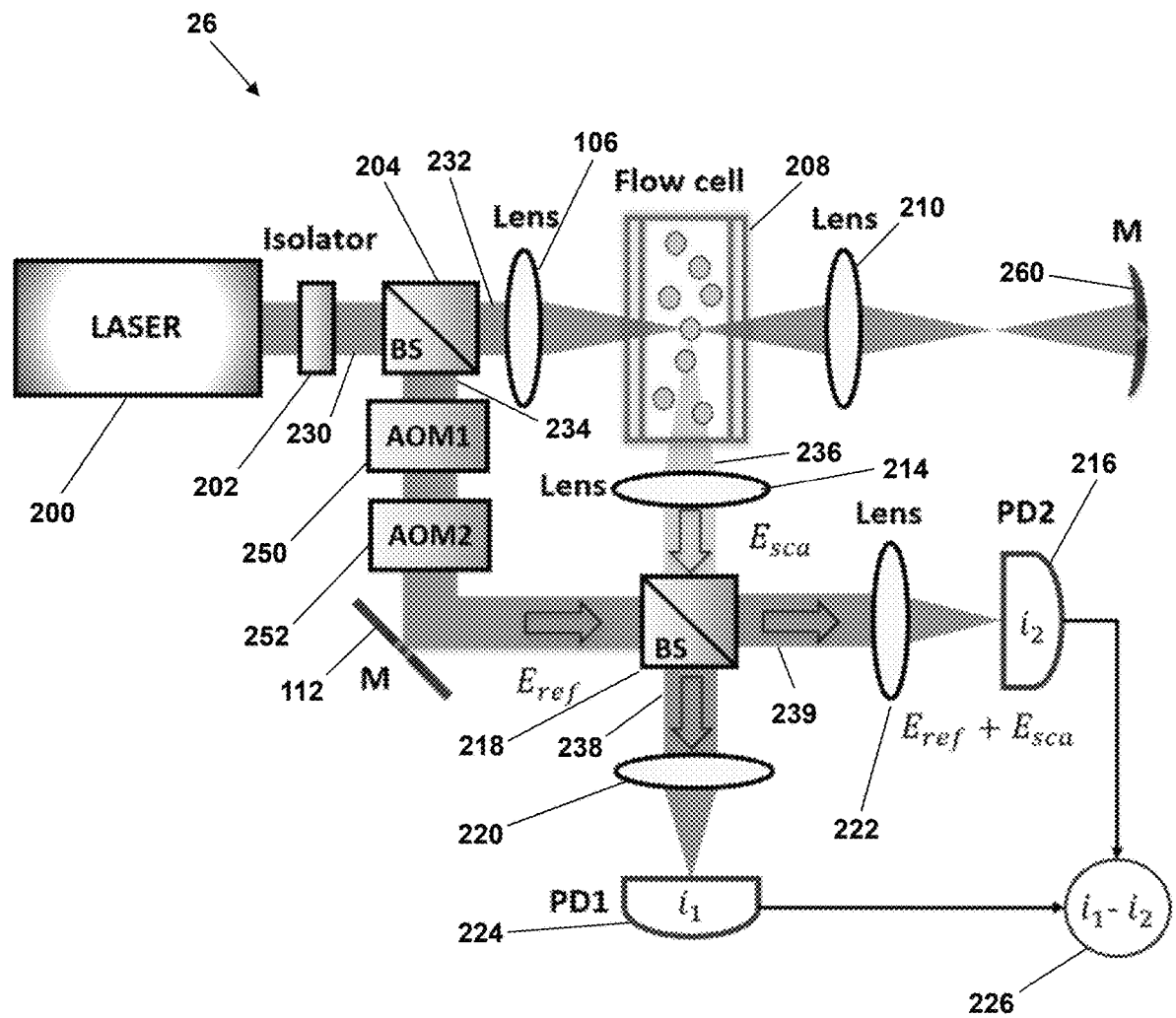
FIG. 2B is an optical schematic of one embodiment of a dual-pass heterodyne interferometric detection system, showing a dual pass configuration using a combination of a lens and a concave mirror in accordance with the present disclosure detection systems.

FIGS. 2A-2B show embodiments of homodyne (FIG. 1A) and heterodyne (FIG. 1B) dual pass detection systems. The dual pass configuration can significantly boost signal to noise ratios, allowing for improved accuracy and better detection of small particles.

Turning now to FIG. 1A, a dual-pass homodyne particle detection system 20 is shown. System 20 includes a laser light source 200 which produces a source beam 230. Optionally, the source beam 230 may be passed through an isolator 202. The isolator 202 may serve to reduce or eliminate deleterious optical feedback into the laser A first beam splitter 204 splits the source beam into an interrogation beam 232 and a reference beam 234. The interrogation beam 232 may pass through a lens 206 to focus the beam. The interrogation beam 232 then passes through the interrogation zone 208, where it is collected by lens 210, and reflected off plane mirror 211. The interrogation beam 232 is then once again collected by lens 210 and passed back through the interrogation zone 208. Thus, the interrogation beam is reflected back on itself via mirror 211.

The system may be configured such that, at the center of the interrogation zone 208, the interrogation beam 232 in the first pass through the interrogation zone 208 constructively interferes with the reflected interrogation beam traveling in the opposite direction. Thus, the amplified interrogation beam may comprise coherent light. One or more particles in the fluid pass through the focus of the amplified interrogation beam 232 in the interrogation zone 208 and generate a scattered signal 236.

Due to the dual pass configuration described above, the power of the interrogation beam 232 is amplified in the interrogation zone 208, resulting in more scattered light and better detection of particles for a given laser power.

The scattered signal 236 is then collected with a high NA collecting lens 214, collimated and then directed to a second beam splitter 218 via, e.g., mirror 212. The reference beam 243 is mixed with the scattered signal 236 at the surface of beam splitter 218. Beam splitter 218 splits the combination of the reference beam 243 and the scattered signal 236 into a first component beam 238 and second component beam 239. First component beam 238 is collected by lens 222 and focused on a first photodetector 224. Second component beam 239 is collected by lens 220 and focused on a second photodetector 216. A differential signal 226 is produced based on the signals of first and second photodetectors 224, 216.

In one embodiment, the differential signal can be enhanced by sending the same or similar light power to each detector. In one example, beam splitter 218 is a 50:50 beam splitter. Additionally or alternatively, in some embodiments the electronic gain levels on one or both detectors may be adjusted such that the resulting signals achieve good background subtraction.

In one embodiment, the reference beam may be passed through a neutral density filter to attenuate the beam intensity. This may increase the visibility of interference fringes at the detector plane such that the signal to noise ratio is enhanced.

Turning now to FIG. 1B, a dual-pass heterodyne particle detection system 22 is shown. System 22 has many similar components to system 20, however, system 22 includes two acousto-optic modulators (AOM) 250, 252. The AOMs function to shift the frequency of the reference beam 243 relative to the scattered signal 236. In one embodiment, the first component beam 238 is characterized by a phase shift of $\pi/2$ relative to the second component beam 239.

As shown in FIGS. 2A-2B, dual-pass configuration can be implemented with a combination of lens 210 and a concave mirror 260, to increase the stability of the system the plane mirror 211. Both a homodyne system 24 (FIG. 2A), and a heterodyne system 26 (FIG. 2B) are shown. The radiuses of the curvature of the mirror 260 may be aligned with the NA of focusing lens 210.

Figure 3A:
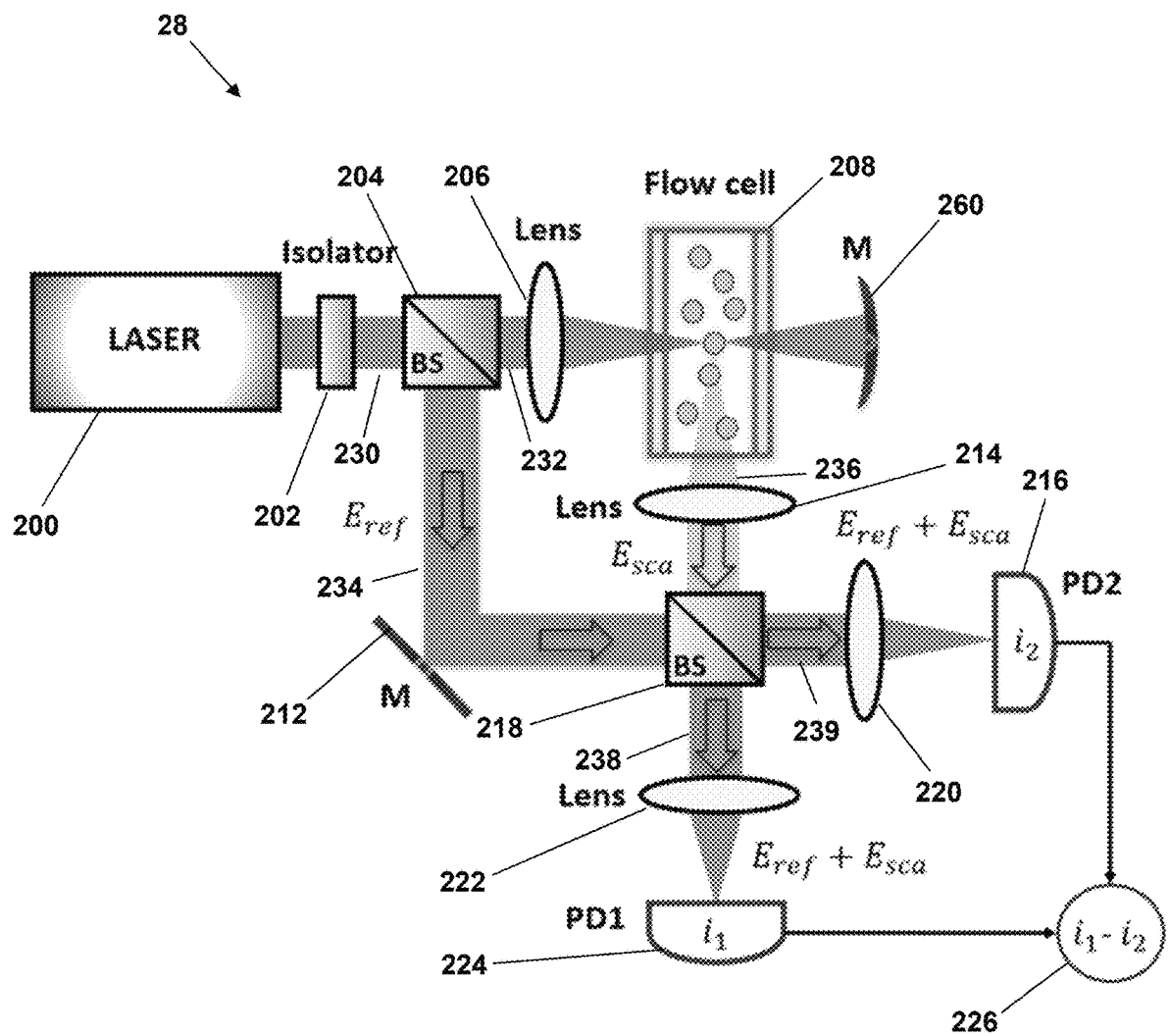
FIG. 3A is an optical schematic of one embodiment of a dual-pass homodyne interferometric detection system, showing a dual pass configuration using a concave mirror in accordance with the present disclosure.
Figure 3B:
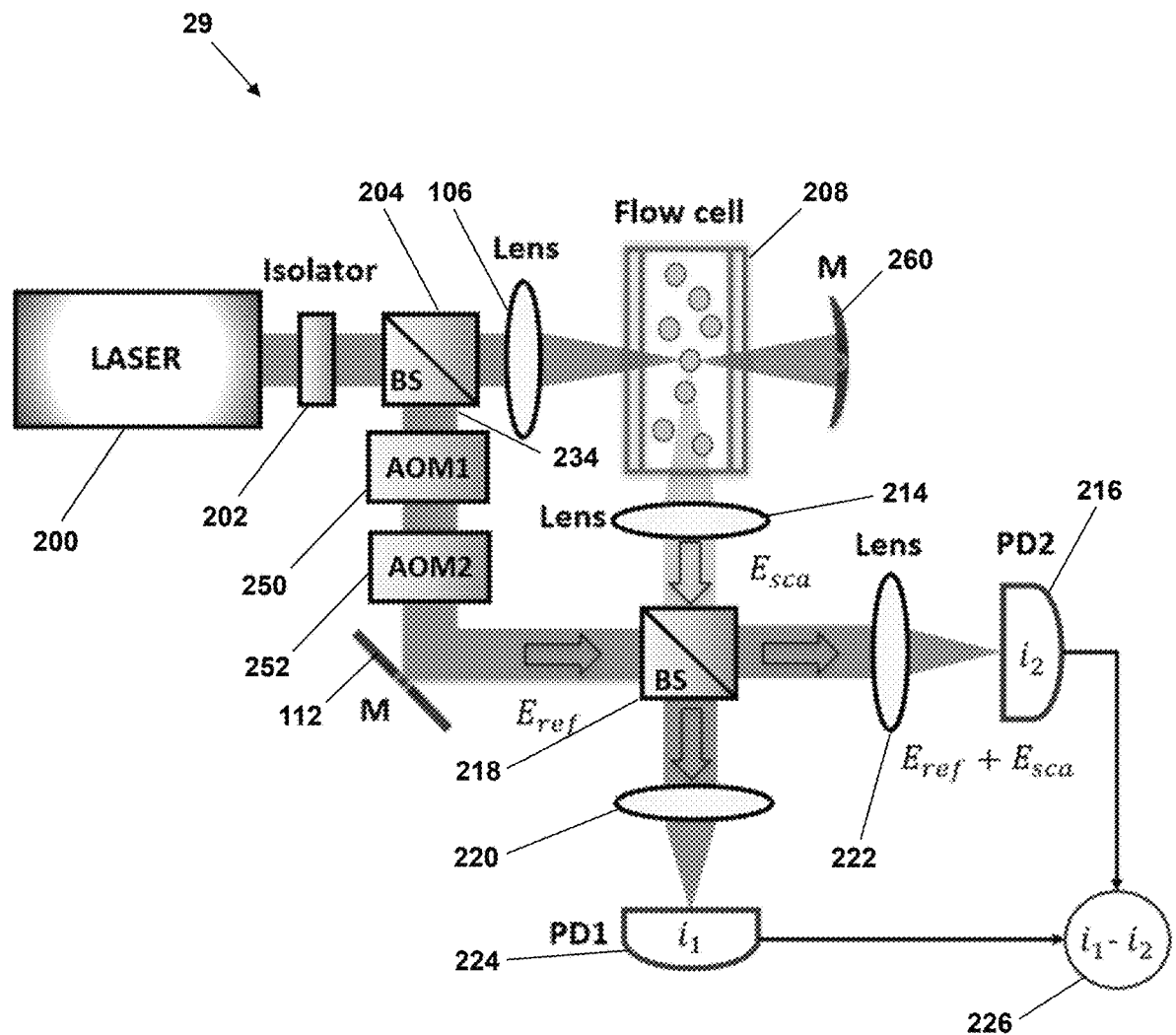
FIG. 3B is an optical schematic of one embodiment of a dual-pass heterodyne interferometric detection system, showing a dual pass configuration using a concave mirror in accordance with the present disclosure.

As shown in FIGS. 3A-3B, in some embodiments, lens 210 may be removed and the dual-pass configuration can be implemented with concave mirror 260. Both a homodyne system 28 (FIG. 3A), and a heterodyne system 29 (FIG. 3B) are shown.

Figure 4:
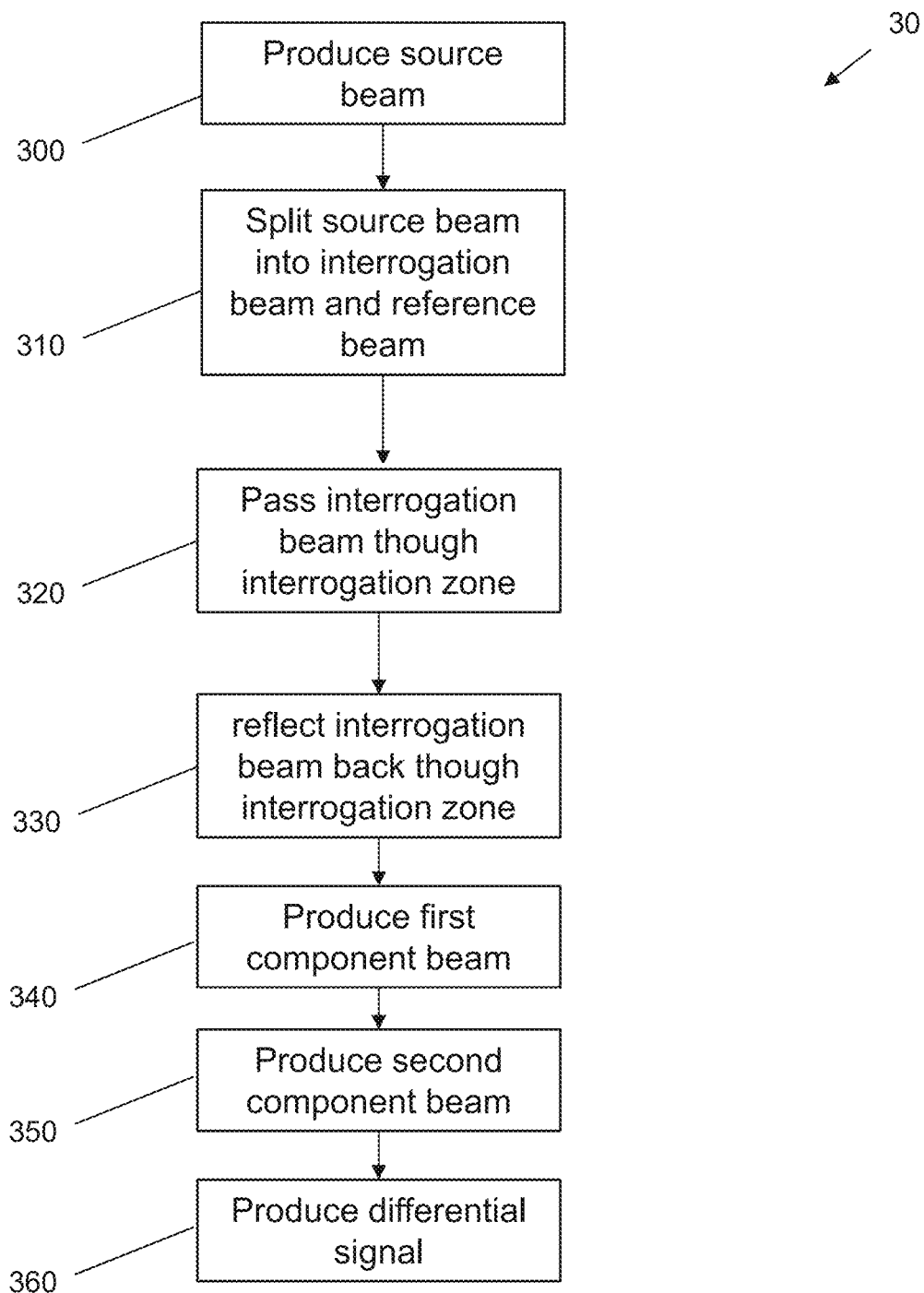
FIG. 4 is a schematic illustration of one embodiment of a method for dual-pass interferometric detection.

Turning now to FIG. 4, a schematic illustration of one embodiment of dual-pass interferometric detection is shown. In the method 30, step 300 comprises producing a source beam of electromagnetic radiation. Next, the source beam may be split into an interrogation beam and a reference beam in step 310. The interrogation beam may be passed through the particle interrogation zone in step 320. In response step 320, the interrogation beam may be reflected back through the particle interrogation zone in step 330. The interrogation beam may interfere with itself constructively in the particle interrogation zone. Side-scattered light may be produced in steps 320 and 330 via interaction of the interrogation beam with a particle in the particle interrogation zone. A first component beam and a second component beam may be produced in steps 340 and 350. A differential signal may then be produced in step 360 based on the detection of the first and second component beams 340, 350.

Figure 5:
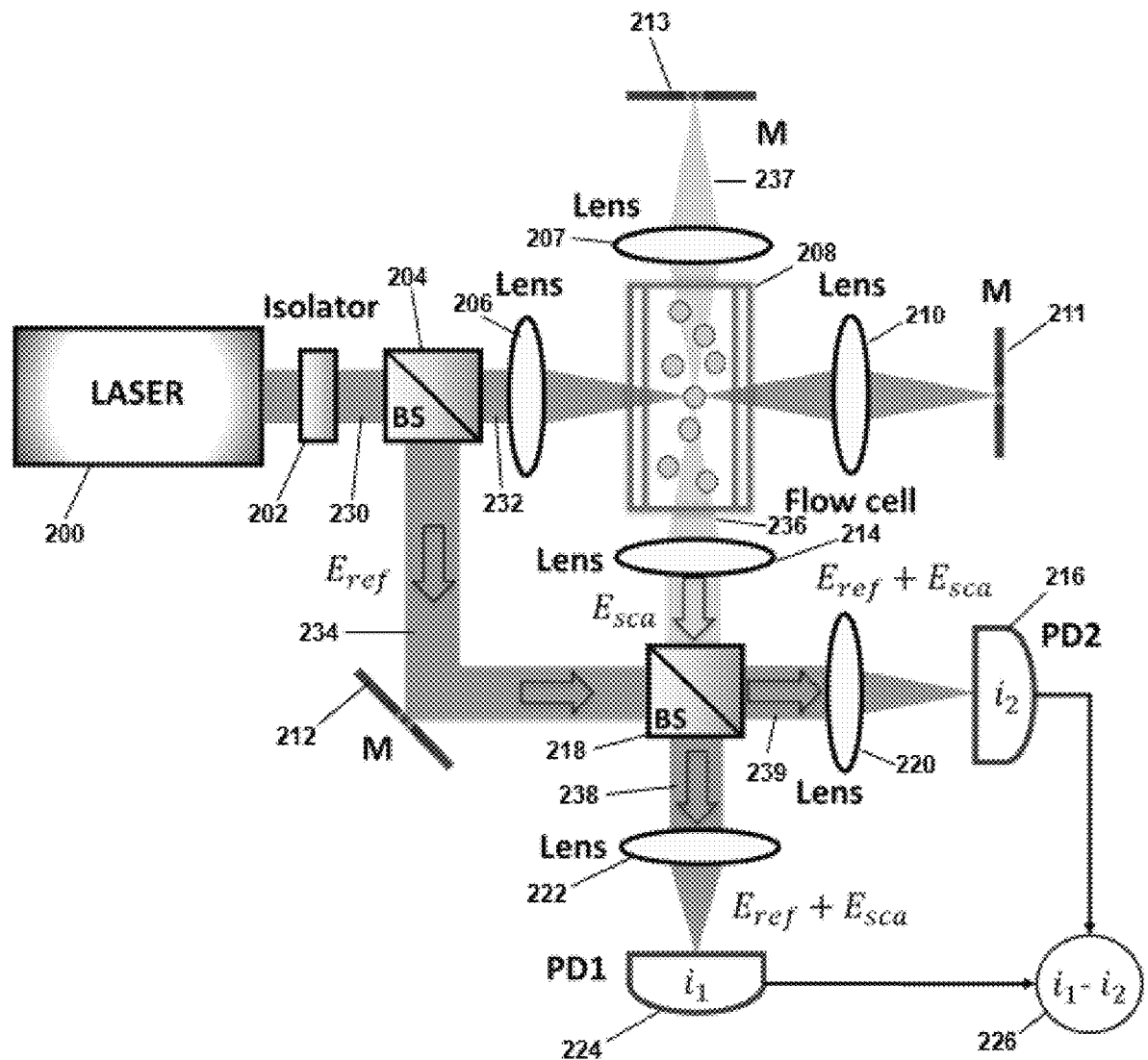
FIG. 5 is an optical schematic of one embodiment of a dual-pass, amplified side scatter, homodyne interferometric detection system in accordance with the present disclosure.

In some embodiments, alternatively or additionally to the features discussed above, the system may be configured to amplify the side scatter signal. For example, FIG. 5, shows one embodiment of a dual-pass, amplified side scatter, homodyne interferometric detection system in accordance with the present disclosure. The system of FIG. 5 has many of the same features as those discussed above. Additionally, the system of FIG. 5 includes a second plane mirror 213 and a focusing lens 207. One or more particles passing through the interrogation zone 208 may interact with amplified interrogation beam 232 and produce a first side scattered beam 237 and second side scattered beam 236. The first side scattered beam may be collected by lens 207 and focused on mirror 213, which may in turn reflect the first side scattered beam 237 back through the interrogation zone 208, where it may combine with the second side scattered beam 236. The combined first and second side scattered beams may then pass through lens 214 to beam splitter 218. Beam splitter 218 may then produce first and second component beams 238, 239 from the reference beam 234 and the combined side scattered beams 237, 236. A differential signal 226 may be produced via detectors 216 and 224, as described above.

Figure 6:
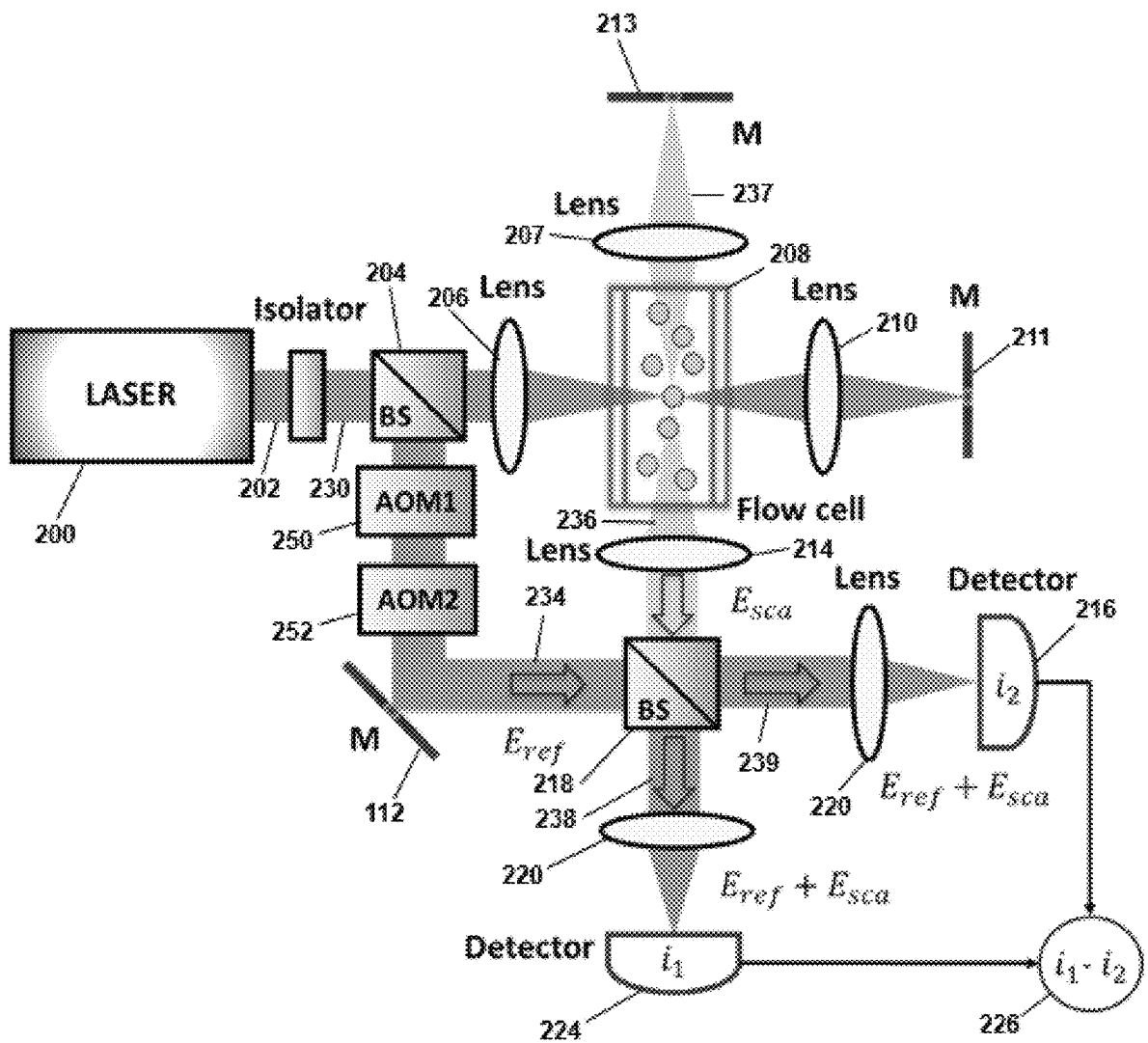
FIG. 6 is an optical schematic of one embodiment of a dual-pass, amplified side scatter, heterodyne interferometric detection system in accordance with the present disclosure.

Turning to FIG. 6, one embodiment of a dual-pass, amplified side scatter, heterodyne interferometric detection system is shown. The system of FIG. 6 is similar to that of FIG. 5, except that the heterodyne interferometric detection system of FIG. 6 includes two acousto-optic modulators (AOM) 250, 252. The AOMs function to shift the frequency of the reference beam 243 relative to the scattered signals 236, 237.

Figure 7:
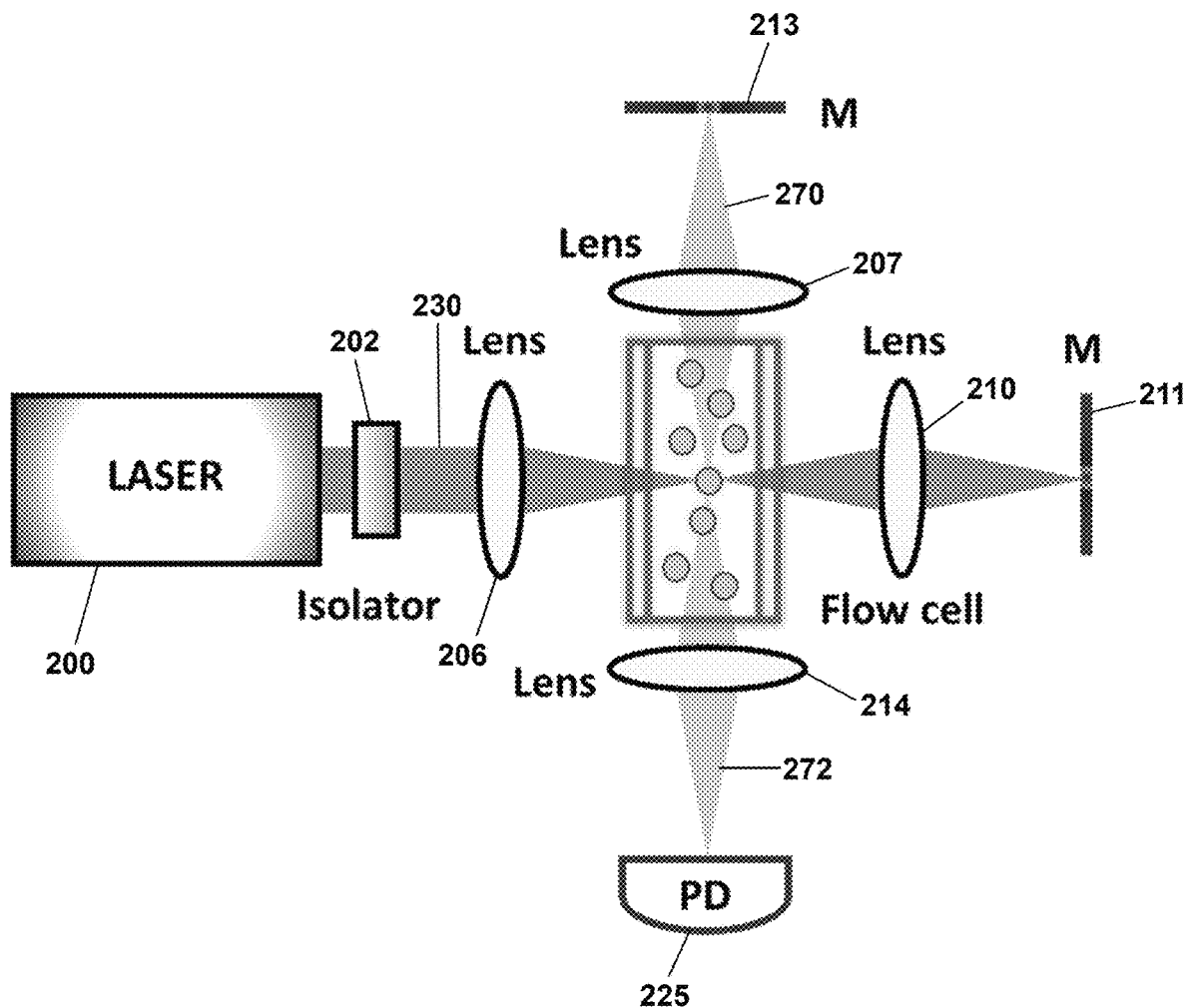
FIG. 7 is an optical schematic of one embodiment of a dual-pass, amplified side scatter detection system in accordance with the present disclosure.
Figure 8:
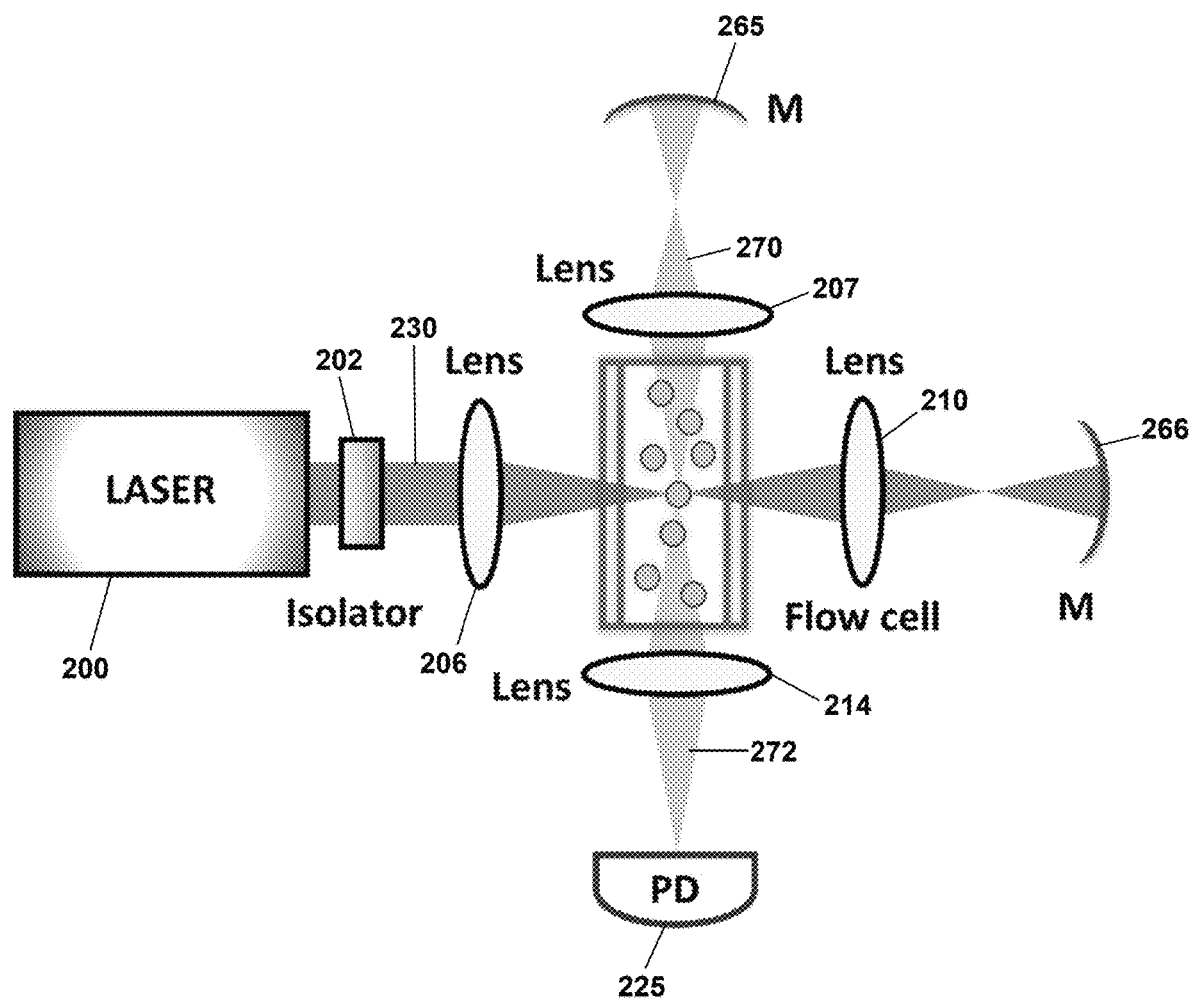
FIG. 8 is an optical schematic of one embodiment of a dual-pass, amplified side scatter detection system in accordance with the present disclosure, showing a dual pass/ amplified side scatter configuration using a combination of a lens and a concave mirror.
Figure 9:
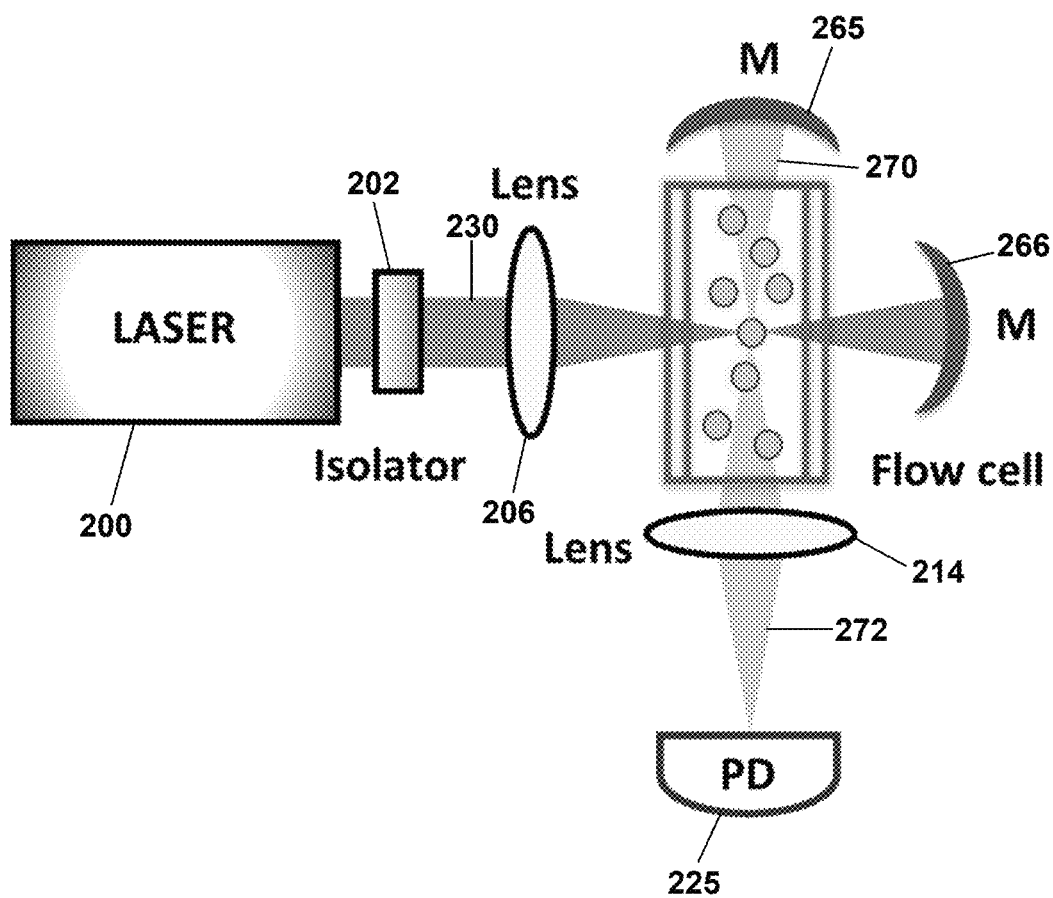
FIG. 9 is an optical schematic of one embodiment of a dual-pass, amplified side scatter detection system in accordance with the present disclosure, showing a dual pass/ amplified side scatter configuration using concave mirrors.

In some embodiments, the dual scattered beam collection systems and methods may be employed in non-interferometric particle detection systems. FIGS. 7-9 show examples of non-interferometric dual scatter particle detection systems. Turning to FIG. 7, the illustrated system includes many of the same features as those described above, however the system lacks the interferometric features such as a beam splitter for splitting a reference beam from the interrogation beam. As shown in FIG. 7, a beam 230 is produced by laser 200. Beam 230 is passed through isolator 202 and lens 206 to focus the beam in the particle interrogation zone 208. Beam 230 is reflected back through the particle interrogation zone by plane mirror 211 and lens 210. The reflected beam 230 may be reflected back on itself and be configured to interfere constructively with the beam on its first pass through the particle interrogation zone. Thus, as described above, beam 230 is amplified in the particle interrogation zone. The system of FIG. 7 further includes lens 207 and plane mirror 213 which function to focus and reflect a first side scattered beam 270 back through the particle interrogation zone where it may be collected, along with a second side scattered beam 272, by lens 214 and detected by detector 225.

Turning to FIG. 8, the illustrated system includes many of the same features as those described above with respect to FIG. 7, except instead of plane mirrors, concave mirrors 265 and 266, respectively, are configured to reflect beam 230 and first side scattered beam 270 back through the particle interrogation zone.

Turning to FIG. 9, the illustrated system includes many of the same features as those described above with respect to with respect to FIGS. 8, except lenses 207 and 210 are eliminated.

Figure 10:
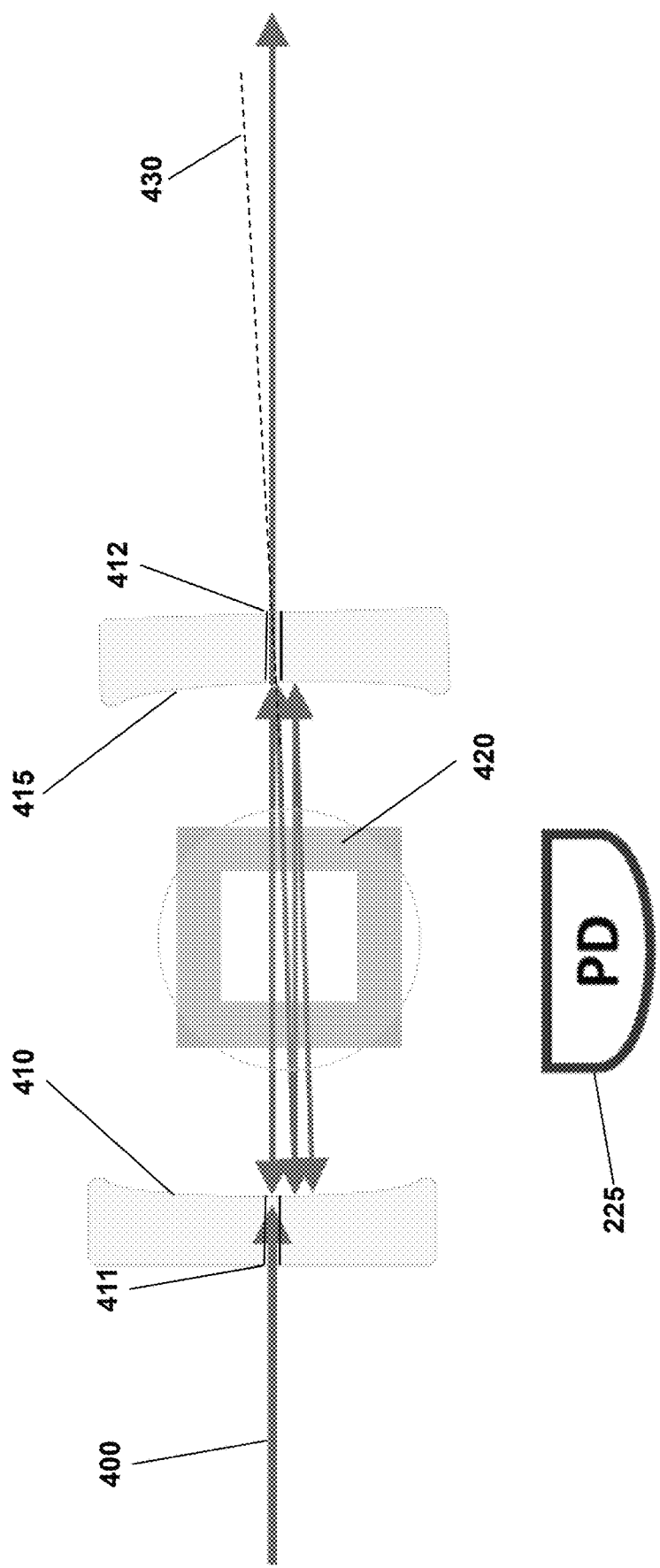
FIG. 10 is an optical schematic of one embodiment of multi-pass side scatter detection system.

Turning now to FIG. 10, one embodiment of a multi-pass system is illustrated. The illustrated embodiment includes a beam of electromagnetic radiation 400 produced by a light source (not shown). The beam 400 enters the particle interrogation zone 420 via a first aperture 411 in a first reflecting surface 410. The beam traverses the particle interrogation zone 420 a first time and then reflects off the second reflecting surface 415 before traversing through the particle interrogation zone 420 a second time. The beam then reflects off the first reflecting surface 410 and traverses through the particle interrogation zone a third time. In the illustrated embodiment, the second reflecting surface has an axis of symmetry 430 that is nonparallel to the beam entering the particle interrogation zone. Thus, each time the beam reflects off one of the reflecting surfaces, the beam reflects at an angle that is nonparallel to the angle at which the beam approaches the respective reflecting surface. The beam may be reflected back and forth through the particle interrogation zone 420 a predetermined number of times before exiting via a second aperture 412 in the second reflecting surface 415. The beam may then be directed to a beam dump.

The particles flow through the particle interrogation zone 420 in a direction orthogonal to the beam (in or out of the page in the embodiment of FIG. 10). Side scattered light is produced via one or more particles interacting with the beam in the particle interrogation zone. The side scattered light is detected via photodetector 225.

In other embodiments, the second aperture 412 may be disposed in the first reflecting surface 410, and spaced apart from the first aperture 411.

In still other embodiments, the reflecting surfaces may be free of any apertures, and the beam may be directed past the edge of the first reflecting surface and onto the second reflecting surface, then reflected onto the first reflecting surface. The beam may reflect back and forth between the two reflecting surfaces, thus "walking" across the reflecting surfaces, a predetermined number of times before being directed past the edge of one of the reflecting surfaces. Alternatively, the system may have one aperture, either to allow the beam to enter or exit the particle interrogation zone.

Figure 11A:
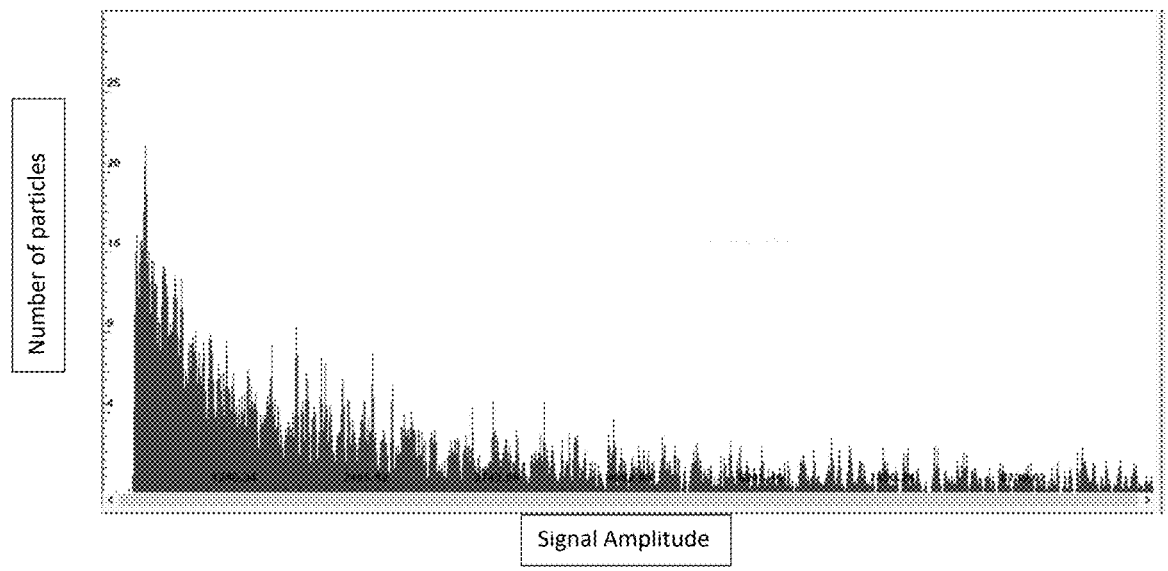
FIGS. 11A and 11B show comparative data for a conventional single pass side scatter particle detector (FIG. 11A) vs a dual-pass side scatter particle detector of the present disclosure (FIG. 11B) measuring the same particles in the same fluid.
Figure 11B:
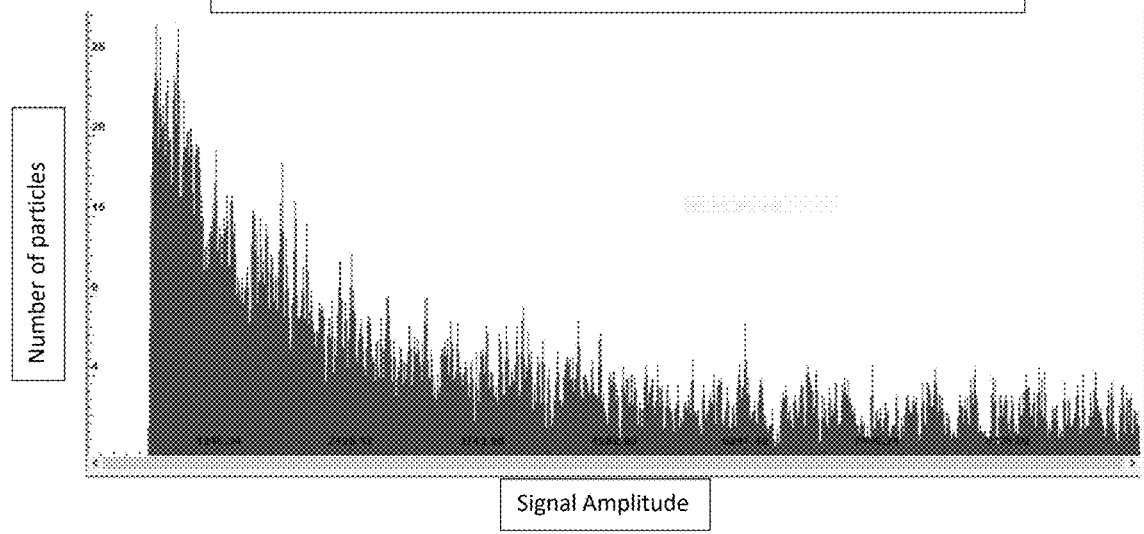

Example 1 Comparative Study of Conventional Single Pass Side Scatter Detection Vs Dual Pass Side Scatter Detection A comparative study was performed to test the particle detection performance of a dual-pass side scatter particle detection system vs a conventional single pass particle detection system. The laser power, particle distribution, particle type, particle concentration, and sample fluid were the same for both systems. The results are shown in FIG. 11A (conventional single pass system) and FIG. 11B (dual-pass system). The graphs of FIGS. 11A-B show number of particles on the Y-axis and detector signal amplitude, which is correlated to particle size on the X-axis. The dual-pass system detected 5203 total particles per minute, more than twice as many as the single pass system, at 2450 particle per minute. Furthermore, the benefit of the dual-pass configurations was particularly noticeable at the smaller particles sizes.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A particle detection system comprising:
    a light source providing a source beam of electromagnetic radiation;
    one or more optical elements configured to convert the source beam into an interrogation beam;
    a particle interrogation zone disposed in the path of the interrogation beam, the particle interrogation zone including particles;
    a first reflecting surface configured to reflect the interrogation beam back on itself to produce an amplified interrogation beam intersecting the particle interrogation zone;
    a second reflecting surface configured to reflect a first side scattered beam toward a photodetector, the first side scattered beam produced via one or more particles interacting with the interrogation beam in the particle interrogation zone;
    the photodetector being configured to detect a combination of:
        the first side scattered beam; and
        a second side scattered beam, the second side scattered beam produced via one or more particles interacting with the interrogation beam in the particle interrogation zone.

2. The system of claim 1, wherein the second reflecting surface is configured to reflect the first side scattered beam back through the interrogation zone.

3. The system of claim 1, wherein the second reflecting surface is configured to reflect the first side scattered beam back on itself to produce an amplified side scattered beam.

4. The system of claim 1, wherein the amplified interrogation beam comprises coherent light.

5. The system of claim 1, comprising an optical isolator positioned between the light source and the reflecting surface to prevent or reduce optical feedback to the light source.

6. A particle detection system comprising:
- a light source providing a source beam of electromagnetic radiation;
- a first beam splitter configured to split the source beam into an interrogation beam and a reference beam;
- a particle interrogation zone disposed in the path of the interrogation beam, the particle interrogation zone including particles;
- a first reflecting surface configured to reflect the interrogation beam back on itself to produce an amplified interrogation beam intersecting the particle interrogation zone;
- a second reflecting surface configured to reflect a first side scattered beam toward a second beam splitter, the first side scattered beam produced via one or more particles interacting with the interrogation beam in the particle interrogation zone;
- the second beam splitter configured to:
  (i) receive the reference beam and a combination of the first side scattered beam and a second side scattered beam, the second side scattered beam produced via one or more particles interacting with the interrogation beam in the particle interrogation zone; and
  (ii) produce a first component beam and a second component beam;
- a first photodetector configured to detect the first component beam; and
- a second photodetector configured to detect the second component beam.

7. The system of claim 6, wherein:
the first component beam comprises a first component of the side scattered beam and a first component of the reference beam; and
the second component beam comprises a second component of the side scattered beam and a second component of the reference beam.

8. The system of claim 6, wherein the second reflecting surface is configured to reflect the first side scattered beam back through the interrogation zone.

9. The system of claim 6, wherein the second reflecting surface is configured to reflect the first side scattered beam back on itself to produce an amplified side scattered beam.

10. The system of claim 6, wherein the amplified interrogation beam comprises coherent light.

11. The system of claim 6, comprising an optical isolator positioned between the light source and the reflecting surface to prevent or reduce optical feedback to the light source.

12. The system of claim 6, wherein the scattered beam and the reference beam are configured for homodyne interferometric detection.

13. The system of claim 6, wherein the scattered beam and the reference beam are configured for heterodyne interferometric detection.

14. The system of claim 13, comprising first and second acousto-optic modulators configured to shift the frequency of the reference beam.

15. The system of claim 13, wherein the first component beam is characterized by a phase shift of $\pi/2$ relative to the second component beam.

16. A particle detection system comprising:
- a light source providing a beam of electromagnetic radiation;
- a particle interrogation zone disposed in the path of the beam, the particle interrogation zone including particles;
- first and second reflecting surfaces disposed on opposite sides of the particle interrogation zone, wherein the first and second reflecting surfaces are configured such that each time the beam reflects off a respective one of the reflecting surfaces, the beam reflects at an angle that is nonparallel to an angle at which the beam approaches the respective reflecting surface; and
- a photodetector configured to detect a side scattered beam produced via one or more particles interacting with the beam in the particle interrogation zone.

17. The system of claim 16, wherein the first reflecting surface has a first axis of symmetry and the second reflecting surface has a second axis of symmetry, and wherein the first and second reflecting surfaces are oriented such that the first axis of symmetry, the second axis of symmetry, or both, is nonparallel to the beam as it enters the interrogation zone.

18. The system of claim 16, wherein the difference between the angle at which the beam approaches the respective reflecting surface and the angle at which the beam reflects off the respective reflecting surface is 2 degrees or less.

19. The system of claim 16, wherein the first reflecting surface, the second reflecting surface, or both, are concave toward the particle interrogation zone.

20. The system of claim 16, comprising a first aperture disposed in the first reflecting surface and a second aperture disposed in the second reflecting surface.

21. The system of claim 16, comprising a first and a second aperture disposed in the first reflecting surface.

22. The system of claim 16, wherein the first and second reflecting surfaces have a reflectivity greater than 99%.

23. The system of claim 16, wherein the first and second reflecting surfaces are configured such that for each time the beam traverses the particle interrogation zone the beam has beam waist, the beam waist of each traverse overlapping in the interrogation zone.

* * * * *